(12) United States Patent
Kim

(10) Patent No.: US 11,216,406 B2
(45) Date of Patent: Jan. 4, 2022

(54) METHOD OF COMMUNICATION BETWEEN MULTIPLE DEVICES USING USB TYPE-C INTERFACE AND ELECTRONIC DEVICE IMPLEMENTING SAME

(71) Applicant: Samsung Electronics Co., Ltd., Suwon-si (KR)

(72) Inventor: Shin-Ho Kim, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/651,917

(22) PCT Filed: Sep. 21, 2018

(86) PCT No.: PCT/KR2018/011240
§ 371 (c)(1),
(2) Date: Mar. 27, 2020

(87) PCT Pub. No.: WO2019/066406
PCT Pub. Date: Apr. 4, 2019

(65) Prior Publication Data
US 2020/0311011 A1    Oct. 1, 2020

(30) Foreign Application Priority Data

Sep. 27, 2017 (KR) .................... 10-2017-0125075

(51) Int. Cl.
*G06F 13/42* (2006.01)
*G06F 1/3287* (2019.01)
*G06F 9/4401* (2018.01)

(52) U.S. Cl.
CPC ........ *G06F 13/4282* (2013.01); *G06F 1/3287* (2013.01); *G06F 9/4418* (2013.01); *G06F 2213/0042* (2013.01)

(58) Field of Classification Search
CPC ...................................................... G06F 15/78
See application file for complete search history.

(56) References Cited

U.S. PATENT DOCUMENTS 6,691,192 B2 *   2/2004   Ajanovic .............. G06F 13/124
                                                          370/468
8,605,912 B2 *  12/2013   Elkhatib ................. H04L 7/033
                                                             381/22

(Continued)

FOREIGN PATENT DOCUMENTS

CN      106055507 A     10/2016
CN      106487069 A      3/2017

(Continued)

OTHER PUBLICATIONS

ISA/KR, International Search Report and Written Opinion of the International Searching Authority, International Application No. PCT/KR2018/011240, dated Dec. 26, 2018, 13 pages.

(Continued)

*Primary Examiner* — Henry Tsai
*Assistant Examiner* — Juanita Borromeo

(57) ABSTRACT

A method and electronic device for communicating multi devices that use universal serial bus (USB) type-C are provided. The electronic device includes at least one or more interfaces formed as USB type-C, and at least one control circuit electrically connected to the interface. The control circuit may be configured to form a communication path, through chosen terminals of the interfaces, between at least two or more external devices connected to the interfaces.

11 Claims, 15 Drawing Sheets

(56) References Cited

U.S. PATENT DOCUMENTS

| | | | |
|---|---|---|---|
| 2015/0331826 A1* | 11/2015 | Ghosh | G06F 13/4282 |
| | | | 710/313 |
| 2016/0217103 A1 | 7/2016 | Kim | |
| 2016/0285757 A1 | 9/2016 | Srivastava et al. | |
| 2017/0124016 A1 | 5/2017 | Gerber et al. | |
| 2017/0262035 A1 | 9/2017 | Agarwal et al. | |

FOREIGN PATENT DOCUMENTS

| | | |
|---|---|---|
| EP | 3051382 A1 | 8/2016 |
| JP | 2016-218972 A | 12/2016 |
| KR | 10-2016-0092310 A | 8/2016 |

OTHER PUBLICATIONS

Supplementary European Search Report in connection with European Application No. 18863716.9 dated Aug. 7, 2020, 9 pages.
USB Group 3.0 Promoter Group, "Universal Serial Bus Type-C Cable and Connector Specification" Release 1.3, Jul. 14, 2017, 241 pages.
Communication pursuant to Article 94(3) EPC dated May 28, 2021 in connection with European Patent Application No. 18 863 716.9, 4 pages.

\* cited by examiner

FIG.3D

METHOD OF COMMUNICATION BETWEEN MULTIPLE DEVICES USING USB TYPE-C INTERFACE AND ELECTRONIC DEVICE IMPLEMENTING SAME

CROSS-REFERENCE TO RELATED APPLICATIONS

This application is a 371 National Stage of International Application No. PCT/KR2018/011240, filed Sep. 21, 2018, which claims priority to Korean Patent Application No. 10-2017-0125075, filed Sep. 27, 2017, the disclosures of which are herein incorporated by reference in their entirety.

BACKGROUND

1. Field

Various embodiments relate to a method and apparatus for communicating multi devices that use USB type-C.

2. Description of the Related Art

With the recent growth of digital technologies, various types of electronic devices such as mobile communication terminals, personal digital assistants (PDAs), electronic organizers, smart phones, tablet Personal Computers (PCs), wearable devices, etc. are being used widely. These electronic devices are providing various interfaces for data transmission, and are supporting data communication (e.g., transmission or reception) between the electronic devices in a wired scheme or wireless scheme correspondingly to an interface which is configured between the electronic devices.

For example, the electronic device is providing an interface capable of exchanging data in a short-range communication based wireless scheme such as Bluetooth, wireless fidelity (WiFi), near field communication (NFC), etc., and an interface capable of exchanging data in a cable based wired scheme such as a universal serial bus (USB), etc. In recent years, a USB interface, which is a kind of a cable based wired interface, is commercializing a USB 3.1 type-C standard interface (hereinafter, a USB type-C interface). The USB type-C interface can have a symmetric structure, and connect, regardless of directivity, the USB interfaces (e.g., USB connectors) of the electronic devices via a USB cable. For example, the connectors hanging from both ends of the USB cable can have the same shape (form), and even the connectors themselves are not distinguished back and forth, so easy connection is possible without needing to match the directivities of pins of the connectors.

SUMMARY

The USB type-C interface is supporting connection between one host device and a plurality of devices (e.g., slave devices) by a daisy chain scheme or a docking station scheme. The respective devices connected by the USB type-C interface can first of all determine a role (e.g., a host device, a slave device) for a purpose. If a plurality of slave devices are connected to one host device, it makes impossible communication between the respective slave devices.

If the host device is in a sleep mode state, the host device can be woken up, to make possible communication between the slave devices via the host device, for information exchange between the slave devices. Accordingly, for the sake of communication between the slave devices, the host device should be in an operation state, so power consumption of the host device can get worse. Also, if a work load of the host device is in a heavy state, a response to a user can be delayed, thus causing an inconvenience in aspect of user's usability as well.

Various embodiments can provide a method and apparatus for forming a communication path via chosen terminals between a plurality of slave devices connected by a USB type-C interface, thereby making possible communication from the plurality of slave devices to one host device or between the plurality of slave devices.

An electronic device according to various embodiments may include at least one or more interfaces formed as universal serial bus (USB) type-C, and at least one control circuit electrically connected to the interface. The control circuit may be configured to form a communication path, through chosen terminals of the interfaces, between at least two or more external devices connected to the interfaces.

An electronic device according to various embodiments may include a universal serial bus (USB) interface, and a control circuit. The control circuit may be configured to identify a first external electronic device and a second external electronic device which are connected through the USB interface, and in relation to a communication between the first external electronic device and the second external electronic device, transmit setting information related to the communication to the first external electronic device or the second external electronic device such that the first external electronic device or the second external electronic device performs the communication by using a given pin corresponding to a configuration channel among a plurality of pins of the USB interface.

A method for operating in an electronic device having at least one or more interfaces formed as universal serial bus (USB) type-C according to various embodiments may include obtaining that an external device is connected to the interface, and forming a communication path between at least two or more external devices connected to the interfaces through chosen terminals of the interfaces, based on the obtaining.

Various embodiments may form a communication path between a plurality of slave devices via a CC terminal in a state in which the plurality of devices are connected using a USB type-C interface.

Various embodiments may transmit an input signal from a slave device to a host device via a CC terminal by using the bi-phase mark coding (BMC) protocol communication standard.

BRIEF DESCRIPTION OF THE DRAWINGS

FIG. 3A to FIG. 3D are diagrams for explaining a USB type-C interface according to various embodiments.

DETAILED DESCRIPTION

Figure 1:
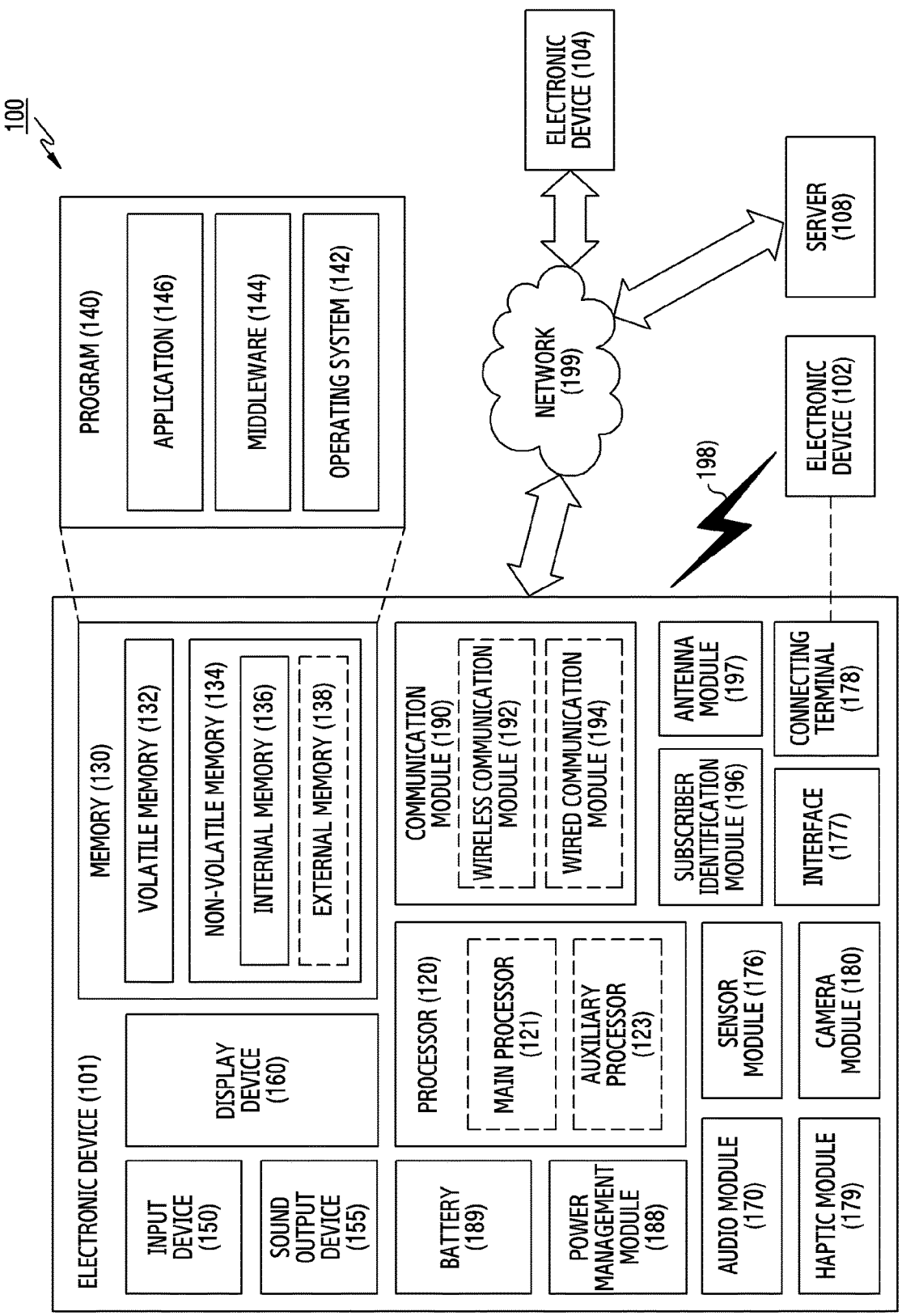
FIG. 1 is a block diagram of an electronic device within a network environment according to various embodiments.

Various embodiments of the disclosure are mentioned below with reference to the accompanying drawings. However, various embodiments and the terms used in various embodiments do not intend to limit a technology mentioned in the disclosure to a specific embodiment form, and should be understood as including various modifications, equivalents and/or alternatives of various embodiments. With regard to a description of the drawings, like reference numerals may be used to refer like components. And, an embodiment disclosed in the disclosure has been suggested for explanation and understanding of the technology disclosed, and does not limit the scope of the technology mentioned in the disclosure. Accordingly, the scope of the disclosure should be interpreted as including all changes or various other embodiments that are based on the technological spirit of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

In such cases, the auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may include, for example, a speaker or a receiver for outputting sound signals to the outside of the electronic device 101. According to an embodiment, the receiver may be implemented as separate from, or as part of the speaker.

The display device 160 may include, for example, a display, a hologram device, or a projector and control circuitry to control a corresponding one of the display, hologram device, and projector for visually providing information to the outside (e.g., a user) of the electronic device 101. According to an embodiment, the display device 160 may include touch circuitry, or a pressure sensor (or a force sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102) (e.g., a speaker or a headphone) wiredly or wirelessly coupled with the electronic device 101.

The sensor module 176 may generate an electrical signal or data value corresponding to an operational state (e.g., power or temperature) internal to the electronic device 101 or an environmental state external to the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support a designated protocol capable of coupling the electronic device 101 with the external electronic device (e.g., the electronic device 102) wiredly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector capable of physically connecting the electronic device 101 with the external electronic device (e.g., the electronic device 102), such as, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 as a device for managing power supplied to the electronic device 101 may be implemented as at least part of, for example, a power management integrated circuit (PMIC).

The battery 189 as a device for supplying power to at least one component of the electronic device 101 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

According to an embodiment, the wireless communication module 192 may identify and authenticate the electronic device 101 in a communication network using subscriber information stored in the subscriber identification module 196.

The antenna module 197 may include one or more antennas to transmit or receive a signal or power to or from the outside. According to an embodiment, the communication module 190 (e.g., the wireless communication module 192), via at least one antenna appropriate for a communication scheme, transmit or receive a signal to or from the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
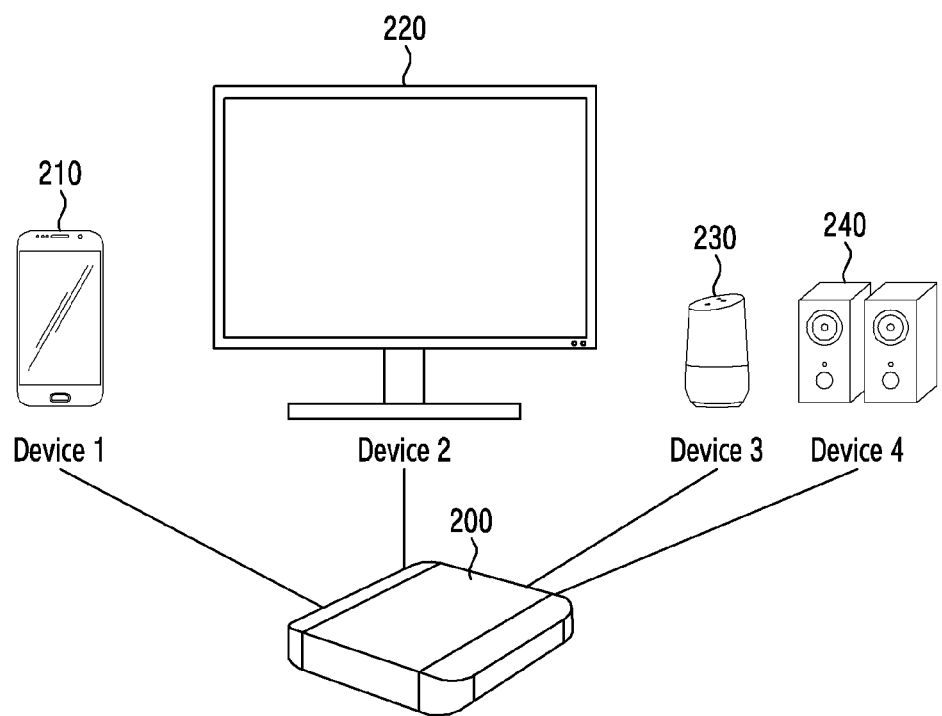
FIG. 2A and FIG. 2B are diagrams illustrating an example of connecting a plurality of devices according to various embodiments.
Figure 2B:
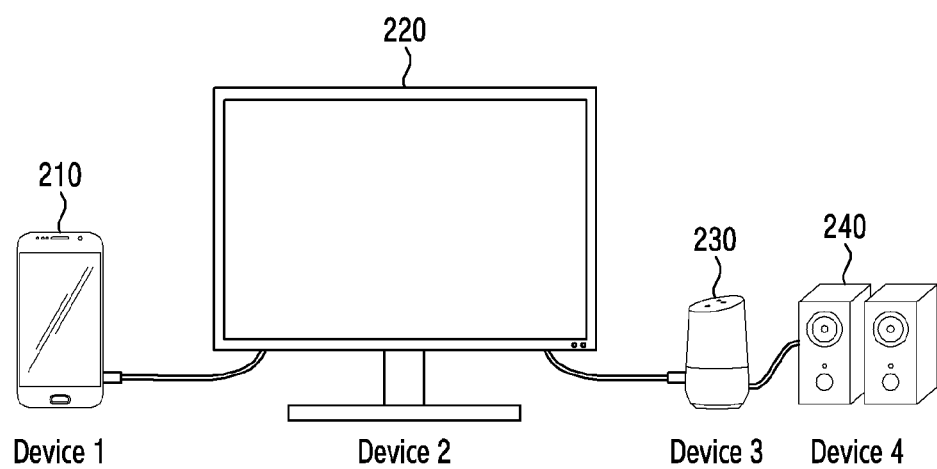

FIG. 2A and FIG. 2B are diagrams illustrating an example of connecting a plurality of devices according to various embodiments.

FIG. 2A is a diagram illustrating an example of connecting the plurality of devices in a docking station scheme.

Referring to FIG. 2A, the docking device 200 may be connected with a first device 210 (e.g., the electronic device 101), a second device 220 (or a second external device, a second external electronic device), a third device 230 (or a third external device, a third external electronic device) and a fourth device 240 (or a fourth external device, a fourth external electronic device) by a USB type-C interface. The USB type-C interface (or connector) may have a symmetrical structure, and connect, regardless of directivity, devices via a USB cable. For example, the connectors hanging from both ends of the USB cable may have the same shape (form), and even the connectors themselves are not distinguished back and forth, so easy connection is possible without needing to match the directivities of pins of the connectors. This docking device 200 may include a plurality of connectors capable of physically connecting with the plurality of devices 210 to 240. The plurality of connectors may be all formed as USB type-C. The docking device 200 according to various embodiments may be a power supply device.

The first device 210 may be the electronic device 101 of FIG. 1, and the second device 220 may be a display device, and the third device 230 may be an artificial intelligence (AI) device, and the fourth device 240 may be a speaker. The respective devices are, for example, illustrated for description convenience's sake, and the respective devices are not limited by the description.

When a connection terminal (e.g., the connection terminal 178) (or connector) of the first device 210 is connected to a first connector, the docking device 200 may send a request for device information to the first device 210, and receive first device information from the first device 210 by the request. For example, the first device information may include at least one of a device identifier of the first device 210, a device type, a protocol (e.g., communication method), or power information (e.g., power consumption). The communication method may include whether to USB communicate and/or whether there is a need for conversion into an alternate mode such as PCI express (PCIe) or display port (DP). The docking device 200 may obtain that the first device 210 has been connected through a configuration channel (CC) terminal (e.g., CC1, CC2) (or single wire communication) of the first connector, and may toggle pull-up (Rp) or pull-down (Rd) while setting the first device 210 as any one of a host device (e.g., a downstream facing port (DFP)) or a slave device (e.g., an upstream facing port (UFP)).

For example, in response to setting the first device 210 as the host device, the docking device 200 may allocate (or grant) a host ID to the first device 210. In response to the second device 220, the third device 230 and the fourth device 240 being simultaneously or sequentially connected to the respective connectors, the docking device 200 may send a request for device information to each device in connected sequence, and receive each device information by the request. In response to allocating the host ID to the first device 210, the docking device 200 may allocate a slave ID to the second device 220, the third device 230 or the fourth device 240.

When ID allocation for each device is completed, the docking device 200 may transmit the allocated IDs to all the devices connected (e.g., the first device 210 to the fourth device 240). For example, the docking device 200 may transmit not only the ID of the second device 220 but also the IDs allocated the first device 210, the third device 230 and the fourth device 240, to the second device 220, respectively. The second device 220 may receive its own ID and the IDs allocated to the first device 210, the third device 230 and the fourth device 240, respectively. The docking device 200 may store device information by allocated ID. Also, the docking device 200 may control a CC terminal of each connector to be maintained in an awake mode, without entering a sleep mode. In the conventional art, if the device information is exchanged and the ID allocation is ended, the CC terminal can enter the sleep mode. But, even after the device information is exchanged and the ID allocation is completed, the present disclosure may maintain a power source of the CC terminal in an awake state.

By awaking a power source of a CC terminal of each interface (or connector) of the docking device 200, a communication path may be formed between devices (e.g., the second device 220 to the fourth device 240) allocated slave IDs via the CC terminals. For example, in response to the second device 220, the third device 230 or the fourth device 240 being allocated the slave ID, the second device 220, the third device 230 or the fourth device 240 may perform a bi-phase mark coding (BMC) communication by using the allocated ID.

In this case, the third device 230 may transmit a signal related to screen brightness adjustment to the second device 220 by using the ID of the second device 220, thereby adjusting a screen brightness of the second device 220. Or, the third device 230 may transmit a signal related to volume level adjustment to the fourth device 240 by using the ID of the fourth device 240, thereby adjusting a volume level of the fourth device 240. That is, the third device 230 may obtain a user input (e.g., a voice input, a touch input, etc.), and control each device by using an ID of each device according to the obtained user input. That is, the third device 230 may control the screen brightness adjustment of the second device 220 or the volume level adjustment of the fourth device 240 through the BMC communication, without waking up the first device 210. The BMC communication will be described in detail through FIG. 3D described later.

FIG. 2B is a diagram illustrating an example of connecting a plurality of devices in a daisy chain scheme.

Referring to FIG. 2B, the first device 210 (e.g., the electronic device 101) may be connected with the second device 220 by the USB type-C interface (or connector). In response to the second device 220 being connected to a connection terminal (e.g., the connection terminal 178), the first device 210 may send a request for device information to the second device 220, and receive second device information from the second device 220 by the request. The second device information may include at least one of a device identifier of the second device 220, a device type, a protocol, or power information. While toggling pull-up or pull-down, the first device 210 may set the second device 220 as any one of a host device or a slave device.

For example, the first device 210 may allocate a host ID to self, and allocate a slave ID to the second device 220. The first device 210 may transmit the allocated slave ID to the second device 220. After exchanging device information with the second device 220 and completing ID allocation, the first device 210 may enable a CC terminal to enter a sleep mode. For example, in response to a connected device being only the second device 220, the first device 210 may enable a CC terminal of a USB type-C interface to enter the sleep mode. Or, even in response to the connected device being only the second device 220, the first device 210 may maintain a power source of the CC terminal of the USB type-C interface in an awake mode.

The first device 210 may be connected with the third device 230 via the second device 220, or may be connected with the fourth device 240 via the third device 230. While the first device 210 according to various embodiments is connected with the second device 220, whenever another device (e.g., the third device 230 or the fourth device 240) is connected, the first device 210 may reallocate IDs of the second device 220 and the another device. For example, in response to the third device 230 being connected via the second device 220, the first device 210 may allocate IDs to the second device 220 and the third device 230, respectively. After exchanging device information with the third device 230 and completing ID allocation, the first device 210 may instruct the second device 220 and the third device 230 to maintain power sources of CC terminals in an awake state. The first device 210 may transmit the allocated IDs to the second device 220 and the third device 230.

Also, the first device 210 may be connected with the fourth device 240 via the third device 230. The first device 210 may allocate IDs to the second device 220 to the fourth device 240, and transmit the allocated IDs. After exchanging device information with the fourth device 240 and completing ID allocation, the first device 210 may instruct the second device 220 to the fourth device 240 to maintain power sources of CC terminals in the awake state. That is, the first device 210 may transmit an ID for each device to all the devices allocated the IDs, and instruct awakening of the CC terminals. The first device 210 may store device information by allocated ID.

By awakening a power source of a CC terminal of each interface (or connector) by the first device 210, a communication path may be formed between devices (e.g., the second device 220 to the fourth device 240) allocated slave IDs via CC terminals. For example, in response to the second device 220, the third device 230 or the fourth device 240 being allocated the slave ID, the second device 220, the third device 230 or the fourth device 240 may perform a BMC communication by using the allocated ID.

FIG. 3A to FIG. 3D are diagrams for explaining a USB type-C interface according to various embodiments.

Figure 3A:
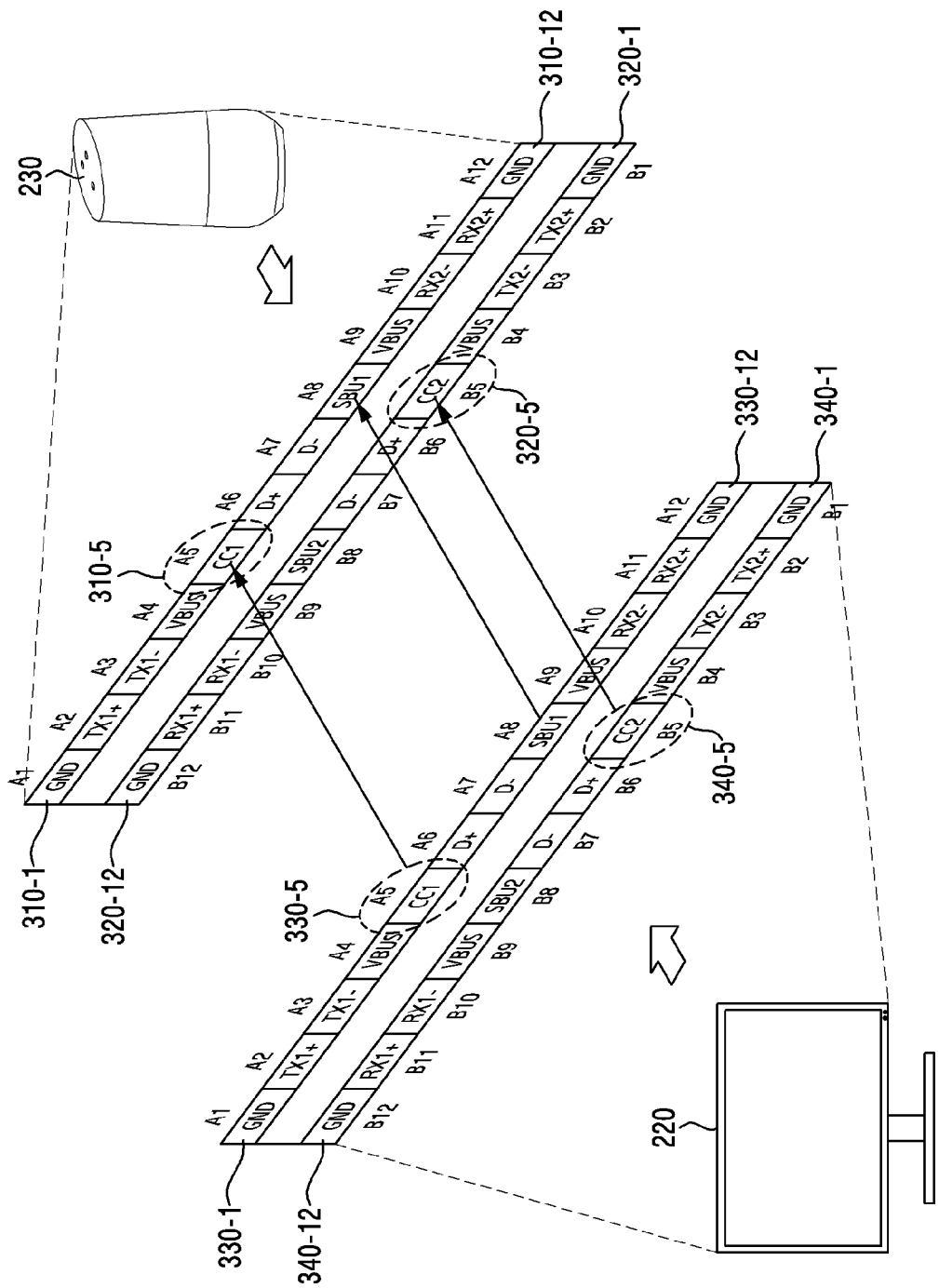

FIG. 3A is a diagram illustrating functions of a plurality of pins which are formed in contact point substrates of an interface of the second device 220 and an interface of the third device 230 according to various embodiments. In FIG. 3A, the interfaces of the second device 220 and the third device 230 are shown as an example, but even interfaces of the first device 210 and the fourth device 240 may be identically applicable.

Referring to FIG. 3A, the second device 220 may be connected with the third device 230 via the interfaces (or connectors). The interface of the second device 220 and the interface of the third device 230 may be formed as USB type-C connectors which are capable of connecting with each other regardless of directivity. For example, connectors hanging from both ends of a USB cable may have the same shape (form), and even the connectors themselves are not distinguished back and forth, so easy connection is possible without needing to match the directivities of pins of the connectors.

The contact point substrate may be formed within the interface of the second device 220. The contact point substrate may have twelve pins 330-1, . . . 330-5, . . . 330-12 in its upper surface, and have twelve pins 340-1, . . . 340-5, . . . 340-12 in its lower surface. A mid-plate having an electrically conductive characteristic may be formed within the contact point substrate. Also, the interface of the third device 230 may have twelve pins 310-1, . . . 310-5, . . . 310-12 in its upper surface in order to contact with the twelve pins 330-1, . . . 330-5, . . . 330-12 formed in the upper surface of the interface of the second device 220. Also, the interface of the third device 230 may have twelve pins 320-1, . . . 320-5, . . . 320-12 in its lower surface in order to contact with the twelve pins 340-1, . . . 340-5, . . . 340-12 formed in the lower surface of the interface of the second device 220.

That is, the number of pins constructed in the interface of the second device 220 and the number of pins constructed in the interface of the third device 230 may be identical with each other. Accordingly, the interface of the second device 220 and the interface of the third device 230 are formed to be identical in an array sequence of the twelve pins formed in the upper surface and an array sequence of the twelve pins formed in the lower surface, so connection is possible regardless of directivity (e.g., a state of being rotated by 180 degrees).

The array of the pins formed in the upper surface and the lower surface is given as in [Table 1] below.

TABLE 1

| Pin | Pin | Name | Function | Note |
| --- | --- | --- | --- | --- |
| A1 | B1 | GND | Power | Support for 60 W minimum (combined with all VBUS pins) |
| A2 | B2 | TX1+ | USB 3.1 or Alternate Mode | 10 Gb/s differential pair with TX1− |
| A3 | B3 | TX1− | USB 3.1 or Alternate Mode | 10 Gb/s differential pair with TX1+ |
| A4 | B4 | VBUS | Power | Support for 60 W minimum (combined with all VBUS pins) |
| A5 | B5 | CC1 | CC or VCONN | — |
| A6 | B6 | D+ | USB 2.0 | — |
| A7 | B7 | D− | USB 2.0 | — |
| A8 | B8 | SBU1 | Alternate Mode | Lower speed side band signal |
| A9 | B9 | VBUS | Power | Support for 60 W minimum (combined with all VBUS pins) |
| A10 | B10 | RX2− | USB 3.1 or Alternate Mode | 10 Gb/s differential pair with RX2+ |
| A11 | B11 | RX2+ | USB 3.1 or Alternate Mode | 10 Gb/s differential pair with RX2− |
| A12 | B12 | GND | Power | Support for 60 W minimum (combined with all VBUS pins) |

The USB type-C interface has 24 pins. Due to reversibility, the 24 pins may be disposed to have a mirrored configuration. Due to this structure, a user may rotate the interface (or connector) of the second device 220 by 180 degrees, to insert the same into the interface of the third device 230. In this case, symmetric pins may not be used together. For example, in response to TX1+ and TX1− being used, TX2+, TX2−, RX2+, RX2− may not be used and, in response to RX1+ and RX1− being used, RX2+, RX2−, TX2+, TX2− may not be used. Accordingly, the contact point substrate has a total of 24 pins (e.g., 12 pins in the upper surface and 12 pins in the lower surface), but the corresponding pins may not be used at the same time. Which pin is to be used may be identified depending on a connecting cable, a connector attached to an end of the cable, and a connector connection state of a device connected to the connector.

The CC1 pin 310-5 formed in the upper surface of the contact point substrate and the CC2 pin 320-5 formed in the lower surface thereof may be used for grasping the use of the second device 220 connected to the interface of the third device 230. For example, in response to the interface of the second device 220 being stuck in the interface of the third device 230 with the upper surface of the interface of the second device 220 side up and thus the CC1 pin 310-5 of the third device 230 being connected to the CC1 pin 330-5 of the second device 220, the CC2 pin 320-5 of the third device 230 may be used for supplying (VCONN) a power source for a recognition IC of the second device 220. And, in response to the interface of the second device 220 being stuck in the interface of the third device 230 with the upper surface of the interface of the second device 220 side down and thus the CC2 pin 320-5 of the third device 230 being connected to the CC2 pin 340-5 of the second device 220, the CC1 pin 310-5 of the third device 230 may be used for supplying (VCONN) a power source for a recognition IC of the second device 220. These CC pins 310-5 and 320-5 of the third device 230 may be connected by CC or VCONN of the third device 230, and the CC pins 310-5 and 320-5 of the third device 230 may support the CC and VCONN.

And, the SBU1 pin and SBU2 pin of the third device 230 are low-speed signal pins that are allocated to be used in an alternate mode. Prior to power transmission and/or reception, a negotiation on this alternate mode between the second device 220 and the third device 230 may be needed.

Such the interface of the second device 220 and the interface of the third device 230 may be directly connected with each other, and may be connected via the docking device 220 as well. For example, the interface of the second device 220 may be connected to a second interface of the docking device 200, and the interface of the third device 230 may be connected to a third interface of the docking device 200, so the second device 220 and the third device 230 may be connected via the docking device 220.

Also, in response to being connected with each other, devices (e.g., the first device 210 to the fourth device 240) may be divided into and operated as a host (e.g., a downstream facing port (DFP)) and a device (or slave) (e.g., an upstream facing port (UFP)). This designation may be achieved through a CC terminal (e.g., CC1 or CC2) of the interface. For example, a connection method using the interface may use CC1 and CC2 for connector coupling direction recognition and digital data communication, and may perform a role definition of the host (DFP) and the device (UFP) by pull-up (Rp) or current sourcing and pull-down (Rd). In the interface, a pull-down (Rd) side is defined as the device (UFP), and the host (DFP) may supply a power source via a power supply pin (e.g., VBUS, VCONN) according to a need of the device (UFP).

Also, the devices (e.g., the first device 210 to the fourth device 240) may operate as a dual role port (DRP), besides the host (DFP) and the device (UFP). The DRP may refer to a mode (function) capable of adaptively changing the role of the host (DFP) or the device (UFP). For example, in response to the DRP having been connected as the host (DFP), the DRP may be changed into the device (UFP), and in response to the DRP having been connected as the device (UFP), the DRP may be changed into the host (DFP). Also, in response to two DRPs being connected together, a random DRP, for example, any one DRP among the host (DFP) and the device (UFP) may operate the host (DFP), and the other DRP may play a role of the device (UFP). For example, an electronic device such as a smart phone, a PC, etc. may play all roles of the host (DFP) and the device (UFP) and for this, may toggle pull-up and pull-down by periods.

Generally, in response to the devices being designated as the host (DFP) and the device (UFP), the device (e.g., the first device 210) operating as the host (DFP) may forward data to the device (e.g., the second device 220 to the fourth device 240) operating as the device (UFP). Firstly, the device may transmit data via a transmission terminal (e.g., TX1+ and TX1−, RX1+ and RX1−) of the first standard (e.g., USB 3.1) designated by two pairs in the USB interface. Or, in response to the devices not being compatible with the first standard, the device may transmit data via a transmission terminal (e.g., D+, D−) of the second standard (e.g., USB 2.0) designated by one pair.

Figure 3B:
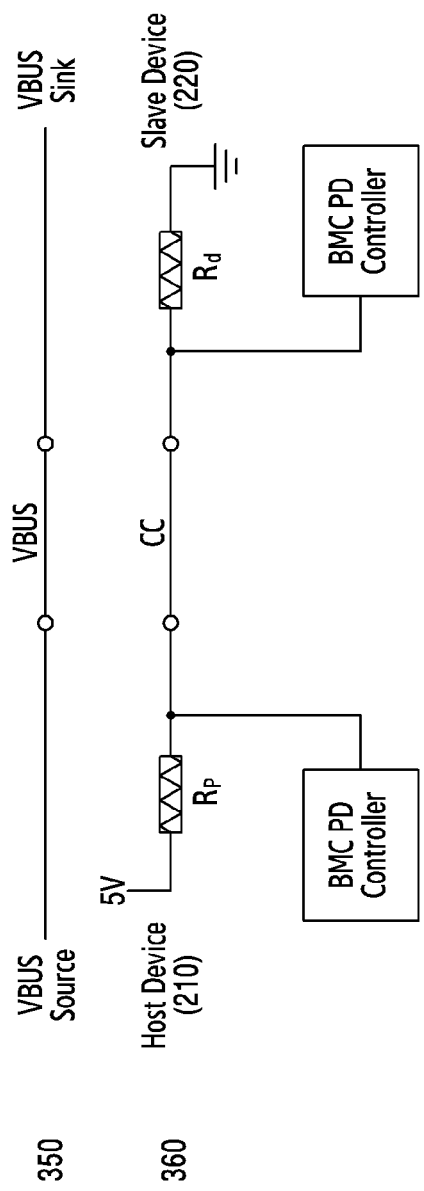

FIG. 3B is a diagram illustrating an example of connecting a CC pin between a host device and a slave device according to various embodiments.

Referring to FIG. 3B, the host device (e.g., the first device 210) may be connected with a slave device (e.g., the second device 220 to the fourth device 240). Considering a connection via a VBUS terminal 350, the host device 210 may play a role (e.g., a VBUS Source) of supplying power, and the slave device 220 may play a role (e.g., a VBUS Sink) of receiving power. The host device 210 may supply power to the slave device 220 via the VBUS terminal 350. Considering a connection via a CC terminal 360, the host device 210 may periodically toggle pull-up (Rp) and pull-down (Rd), while designating self as a host, and designating the slave device 220 as a slave. In response to a connector of the slave device 220 being inserted, the host device 210 may apply a power source (e.g., 5V) to the CC terminal 360, to communicate with the slave device 220 through BMC communication. Also, in the USB type-C interface, a pull-down (Rd) side is defined as the slave (e.g., the device (UFP)), and the host (DFP) may supply a power source via a power supply pin (e.g., VBUS, VCONN) according to a need of the device (UFP).

In the conventional art, if a role definition of the host device 210 and the slave device 220 is completed (e.g., initial hand-shake), the BMC communication via the CC terminal 360 may be terminated. That is, the host device 210 may control the CC terminal 360 to enter a sleep mode. However, in the present disclosure, even though the role definition of the host device 210 and the slave device 220 is completed, the CC terminal 360 may be kept in an operation state, to form a communication path between the host device 210 and the slave device 220 or between the slave devices (e.g., the second device 220 to the fourth device 240). Between the host device 210 and the slave device 220 or between the slave devices (e.g., the second device 220 to the fourth device 240), the BMC communication may be performed via the communication path that uses the CC terminal 360. Accordingly, the slave devices may make possible direct communication between the slave devices, without going through the host device 210 (or without waking up the host device 210). Herein, the communication between the host device 210 and the slave device 220 via the CC terminal 360 may refer to communication from the slave device 220 to the host device 210. That is, a data transmission direction may refer to transmission from the slave device 220 to the host device 210.

Figure 3C:
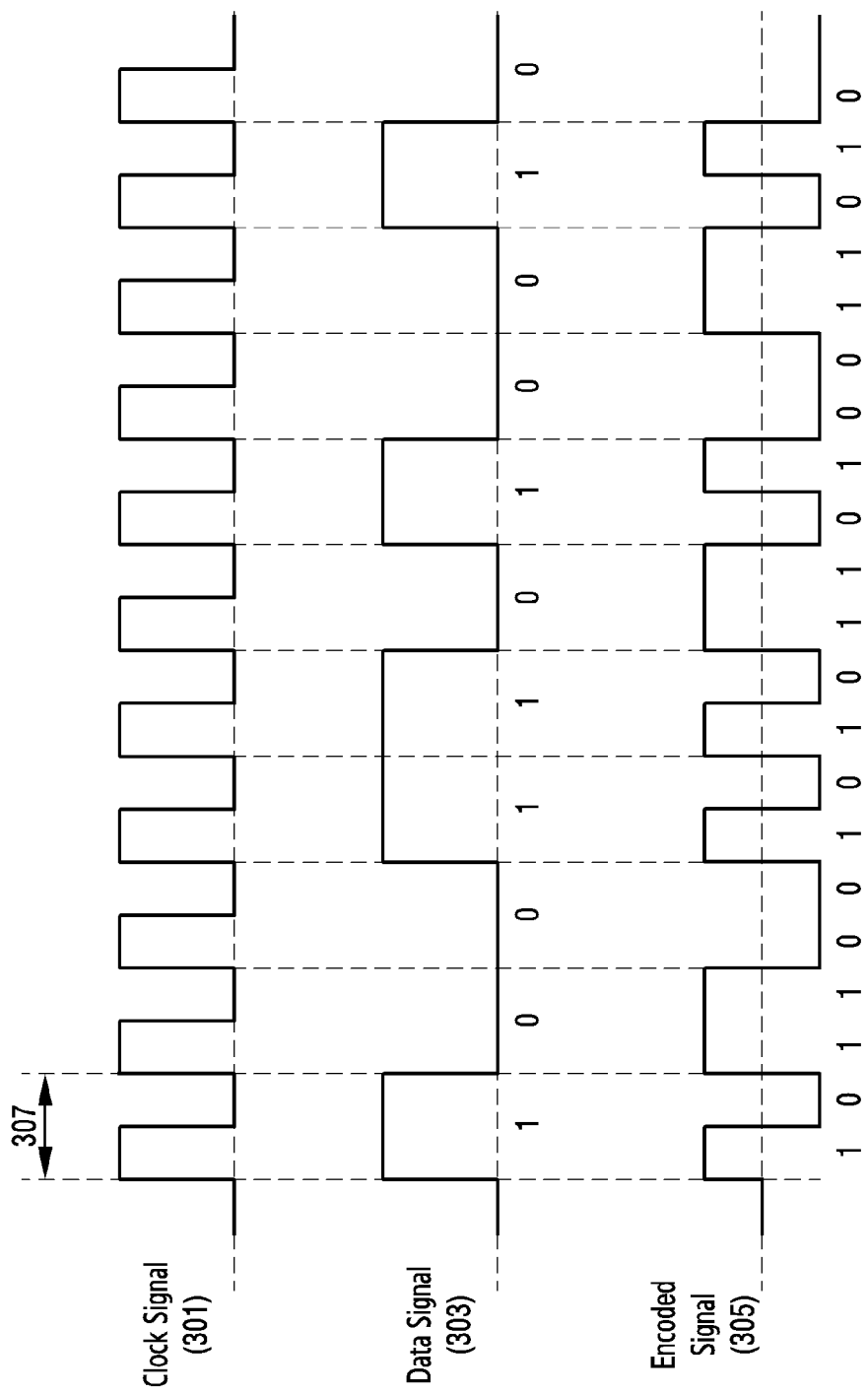

FIG. 3C illustrates an example diagram of encoding of BMC communication according to various embodiments.

Referring to FIG. 3C, an encoded signal 305 of BMC communication may be a modulation of a clock signal 301 and a data signal 303. Accordingly, a receiving side may receive the clock signal 301 and the data signal 303 concurrently. A frequency of the clock signal 301 is two times of a frequency 307 of the data signal 303. And, all bits of the data signal 303 may be expressed by two logic states (e.g., 0 or 1). In response to the data signal 303 being "1", the encoded signal 305 may be outputted as two mutually different bits (10 or 01) according to a previous value. Similarly, in response to the data signal 303 being "0", the encoded signal 305 may be outputted as two identical bits (00 or 11).

That is, in response to the data signal 303 being "1", the encoded signal 305 has a signal change twice per clock, whereas in response to the data signal 303 being "0", the encoded signal 305 has a signal change once per clock. This encoding scheme of BMC communication may be similar with a differential Manchester encoding scheme. In response to a bit value of the encoded signal 305 being changed from "1" to "0" or being changed from "0" to "1", the data signal 303 has a value of "1". And, in response to the bit value of the encoded signal 305 not being changed, the data signal 303 has a value of "0". Accordingly, the receiving side may easily obtain the clock signal. And, in response to a bit "1" or "0" being provided continuously, an asynchronous problem may occur. The BMC communication may avoid the asynchronous problem of serial communication, in that providing at least one zero crossing within 2-bit data.

Figure 3D:
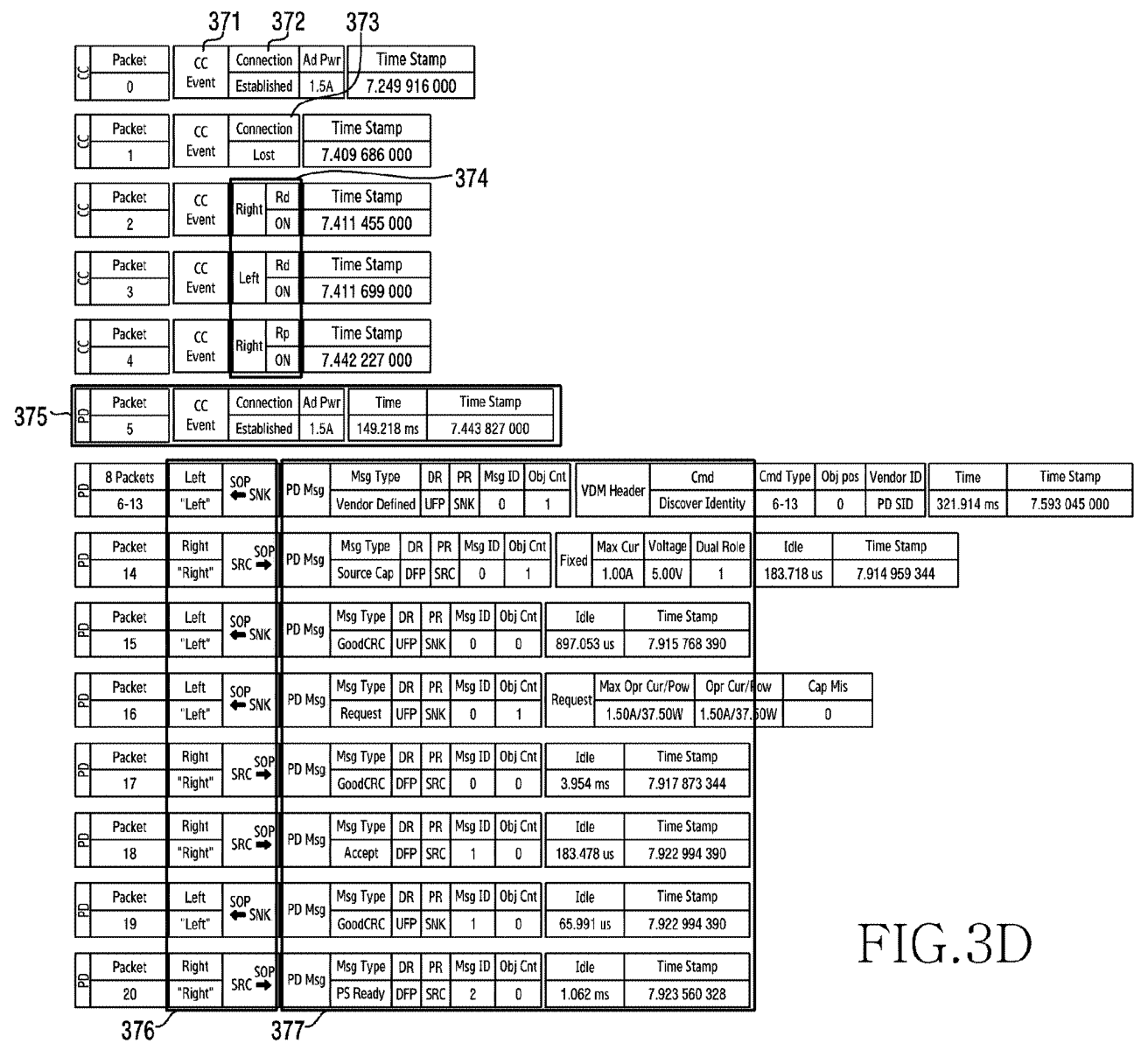

FIG. 3D is a diagram illustrating a data packet forwarded via a CC terminal according to various embodiments.

Referring to FIG. 3D, the data packet may include CC event information 371, a connection state 372 or a disconnection state 373. The CC event information 371 may include device connection or disconnection obtaining, or data transmission direction information. The connection state 372 may indicate a state connected (e.g., connection established) with a device. The disconnection state 373 may indicate a state disconnected (e.g., connection lost) from the device. Also, the data packet may identify the device as a slave or host according to a role definition of the device. A device (e.g., the second device 220 to the fourth device 240) connected to pull-down (Rd) may be designated as the slave (e.g., the device (UFP) (e.g., slave ID (SNK) allocation), and a device (e.g., the first device 210) connected to pull-up (Rp) may be designated as the host (DFP) (e.g., host ID (SRC) allocation). At this time, the data packet may indicate a direction (e.g., right or left) in which the device is connected, based on the number of interfaces formed in the device. Herein, it shows an example in which in response to the interface is two in number, a device connected to the right is designated as the host, and a device connected to the left is designated as the slave.

A data packet 375 may include information capable of, in response to the devices being connected and a host ID and a slave ID being allocated, exchanging device information between the devices through the allocated IDs. The devices may identify a period of time to transmit data, and may transmit information at a period of time at which self is to send. In the conventional art, if the information exchange is completed, the CC terminal enters a sleep mode. Unlike this, in the present disclosure, a power source of the CC terminal may be kept in an awake state. In this case, the devices may BMC communicate between the devices via the CC terminal. For example, the devices may exchange data between the devices by using a data packet 377 which includes a message type (Msg Type) (e.g., Vendor Defined, Source Cap, GoodCRC, Request), a sender (e.g., UFP, SNK), a message ID (e.g., 0, 1, 2), object cnt (e.g., 0, 1). Also, the devices may BMC communicate by using a data packet 376 which includes allocated IDs (e.g., SRC, SNK, and SOP). Considering the data packet 376, the devices may transmit information from the host device to the slave device (e.g., SRC→SOP), or may transmit information from the slave device to the host device (e.g., SNK→SOP) as well.

Figure 4A:
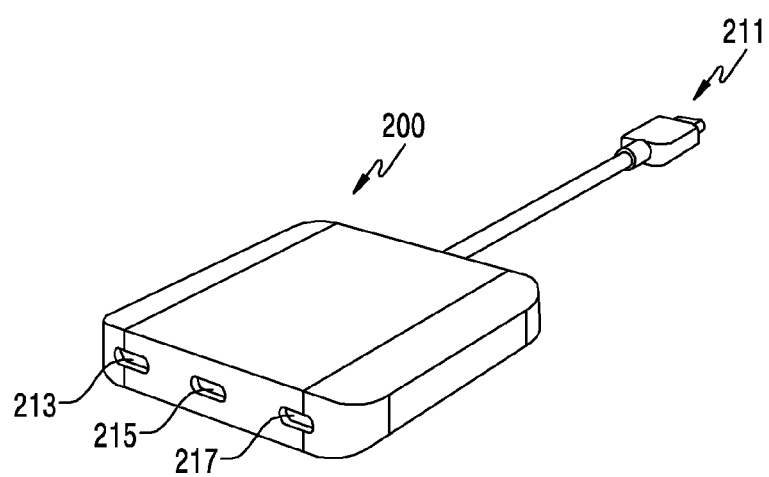
FIG. 4A and FIG. 4B are diagrams illustrating an example of a docking device according to various embodiments.
Figure 4B:
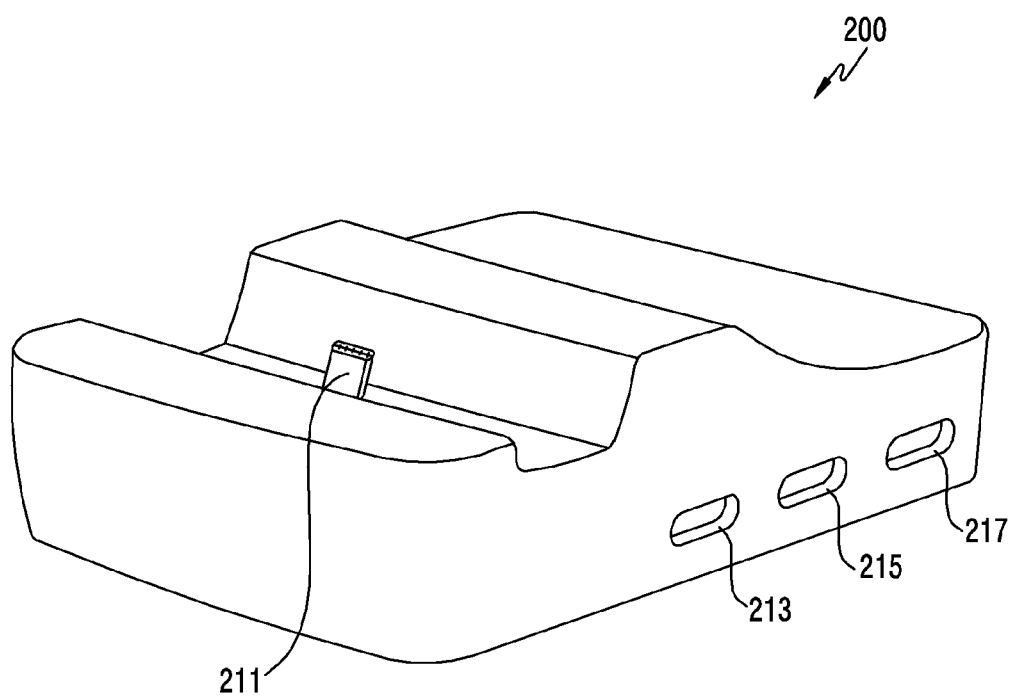

FIG. 4A and FIG. 4B are diagrams illustrating an example of a docking device according to various embodiments.

Referring to FIG. 4A and FIG. 4B, the docking device 200 may be formed in the form of a flat shaped cable as in FIG. 4A, or may be formed in the form of a mount as in FIG. 4B. This docking device 200 may include a plurality of interfaces (or connectors). Also, the plurality of interfaces may be formed as USB type-C. For example, the docking device 200 may include a first interface 211, a second interface 213, a third interface 215, and a fourth interface 217. For example, the first interface 211 may be connected with the first device 210, and the second interface 213 may be connected with the second device 220, and the third interface 215 may be connected with the third device 230, and the fourth interface 217 may be connected with the fourth device 240. The docking device 200 illustrated in FIG. 4A and FIG. 4B is only an example, and a shape of the docking device 200 is not limited by the drawings.

Figure 5:
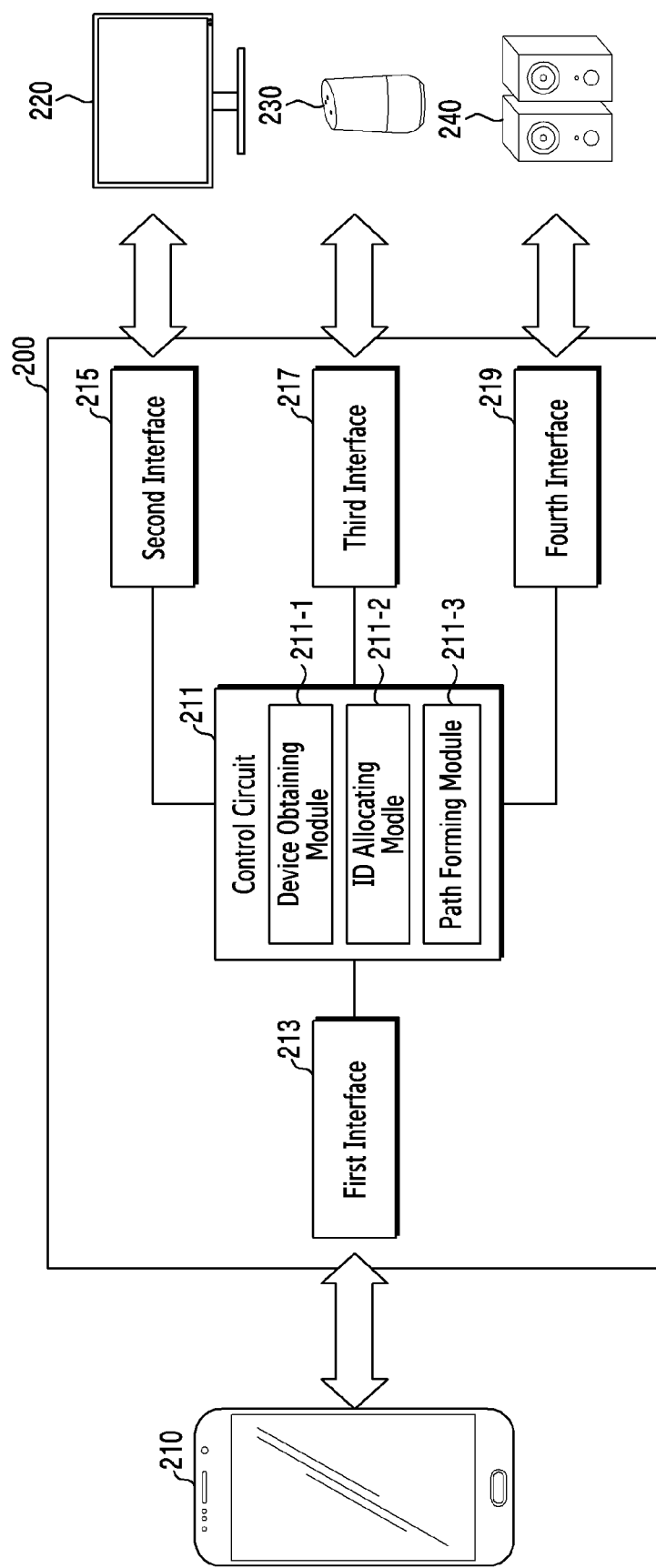
FIG. 5 is a block diagram illustrating a construction of a docking device according to various embodiments.

FIG. 5 is a block diagram illustrating a construction of a docking device according to various embodiments.

Referring to FIG. 5, the docking device 200 may include a first interface 211 (or a first connector), a second interface 213 (or a second connector), a third interface 215 (or a third connector), a fourth interface 217 (or a fourth connector) and a control circuit 219. The docking device 200 of FIG. 5 may be applied to a device to which a plurality of devices are connected in the docking station scheme of FIG. 2A. In FIG. 5, an example is illustrated in which the interface of the docking device 200 is four in number, but the interface may be greater than or less than this. The interface of the docking device 200 according to various embodiments may be at least three or more.

The first interface 211 may employ a USB type-C interface (or connector). The USB type-C interface supports a USB 3.1 protocol. The USB 3.1 protocol is a protocol capable of providing maximum power 100 watts (W) at maximum 20 voltages (V), 5 amperes (A). The first interface 211 may be electrically connected with the first device 210. For example, in response to being connected with the first device 210, the first interface 211 may obtain a signal from at least one of a VBUS pin, CC1 pin or CC2 pin.

The second interface 213, the third interface 215 and the fourth interface 217 may, similarly with the first interface 211, employ the USB type-C interface. The second interface 213 may be electrically connected with the second device 220. For example, in response to being connected with the second device 220, the second interface 213 may obtain a signal from at least one of a VBUS pin, CC1 pin or CC2 pin. The third interface 215 may be electrically connected with the third device 230. The fourth interface 217 may be electrically connected with the fourth device 240.

The control circuit 219 may be a processor, and may be, for example, a micro controller unit (MCU). The control circuit 219 may obtain whether a device is connected to the first interface 211 to the fourth interface 217, and may form a plurality of electrically conductive paths (or communication paths) between the first interface 211 to the fourth interface 217. The control circuit 219 may include a device obtaining module 219-1, an ID allocating module 219-2, and a path forming module 219-3. The device obtaining module 219-1, the ID allocating module 219-2, and the path forming module 219-3 may be included as hardware modules, or may be included as software modules.

The device obtaining module 219-1 may obtain that an interface (or connector) of the first device 210 is inserted into the first interface 211. In response to the interface of the first device 210 being inserted, the device obtaining module 219-1 may obtain a signal (e.g., a device obtaining signal) from at least one of a VBUS pin, CC1 pin or CC2 pin of the first interface 211, and identify that the first device 210 is connected to the first interface 211 by the obtained signal. In response to an interface of the second device 220 being inserted, the device obtaining module 219-1 may obtain a signal from at least one of a VBUS pin, CC1 pin or CC2 pin of the second interface 213, and identify that the second device 220 is connected to the second interface 213 by the obtained signal. The device obtaining module 219-1 may obtain a signal from at least one of a VBUS pin, CC1 pin or CC2 pin of the third interface 215 or fourth interface 217, and identify that the third device 230 is connected to the third interface 215 or that the fourth device 240 is connected to the fourth interface 217 by the obtained signal.

The ID allocating module 219-2 may allocate an ID to a device connected to each interface. The ID allocating module 219-2 may identify the number of devices connected to the docking device 200, and allocate IDs, based on the number. The ID allocating module 219-2 may periodically toggle pull-up (Rp) and pull-down (Rd) in each of the first interface 211 to the fourth interface 217, while allocating a host ID to a device (e.g., the first device 210) connected to pull-up (Rp), and allocating a slave ID to a device connected to pull-down (Rd). For example, the ID allocating module 219-2 may allocate the host ID to the first device 210 connected to the first interface 211, and allocate the slave ID to the second device 220 connected to the second interface 213.

Also, in a state in which the first device 210 is connected to the first interface 211 and the second device 220 is connected to the second interface 213, in response to it being obtained that the third device 230 is connected to the third interface 215 through the device obtaining module 219-1, the ID allocating module 219-2 may reallocate IDs to the first device 210 to the third device 230. The ID allocating module 219-2 may allocate a host ID to the first device 210 connected to the first interface 211, and allocate a first slave ID to the second device 220 connected to the second interface 213, and allocate a second slave ID to the third device 230 connected to the third interface 215. Or, in a state in which the first device 210 is connected to the first interface 211 and the second device 220 is connected to the second interface 213, in response to it being obtained that the third device 230 is connected to the third interface 215 through the device obtaining module 219-1, the ID allocating module 219-2 may reallocate an ID to the third device 230 in a state of maintaining the IDs allocated to the first device 210 and the second device 220.

In a state in which the first device 210 is connected to the first interface 211 and the second device 220 is connected to the second interface 213, in response to it being obtained that the third device 230 is disconnected from the third interface 215 and the fourth device 240 is connected to the fourth interface 217 through the device obtaining module 219-1, the ID allocating module 219-2 may reallocate IDs, based on the number of the connected devices. The ID allocating module 219-2 may allocate a host ID to the first device 210 connected to the first interface 211, and allocate a first slave ID to the second device 220 connected to the second interface 213, and allocate a second slave ID to the fourth device 240 connected to the fourth interface 217. Or, the ID allocating module 219-2 may allocate an ID to the fourth device 240 in a state of maintaining the IDs allocated to the first device 210 and the second device 220.

The ID allocating module 219-2 may allocate a host ID to the first device 210 connected to the first interface 211, and allocate slave IDs (e.g., a first slave ID to a third slave ID) to the second device 220 to the fourth device 240 connected to the second interface 213 to the fourth interface 217. Or, the ID allocating module 219-2 may allocate an ID to the fourth device 240 in a state of maintaining the IDs allocated to the first device 210 to the third device 230.

The path forming module 219-3 may transmit allocated IDs to the first device 210 and the second device 220. That is, the path forming module 219-3 may transmit an ID allocated to each device, to all of devices connected to interfaces. For example, the path forming module 219-3 may transmit the ID (e.g., the host ID) allocated to the first device 210 and the ID (e.g., the slave ID) allocated to the second device 220, to the first device 210 and the second device 220. Before ID allocation or after the ID allocation, the path forming module 219-3 may exchange information with each device (e.g., the first device 210 or the second device 220). The information is device information, and the path forming module 219-3 may send a request for information to the first device 210 or the second device 220, and receive device information from the first device 210 or the second device 220 by the request. The received device information may be stored in a memory (not shown) of the docking device 200.

In response to ID allocation and information exchange being completed, the path forming module 219-3 according to various embodiments may enable CC terminals (e.g., CC1, CC2) of the first interface 211 and the second interface 213 to enter a sleep mode. That is, in response to one host ID and one slave ID being allocated, the path forming module 219-3 may enable the CC terminals of the first interface 211 and the second interface 213 to enter the sleep mode. Or, even in response to the ID allocation and the information exchange being completed, the path forming module 219-3 may maintain the CC terminals of the first interface 211 and the second interface 213 in an operation mode (e.g., an awake state). Accordingly, an electrical conductive path (e.g., a communication path) may be formed in the CC terminal of the first interface 211 and the CC terminal of the second interface 213. In this case, the first device 210 and the second device 220 may BMC communicate by using the electrical conductive path. That is, the second device 220 may transmit data to the first device 210 via the electrical conductive path.

The path forming module 219-3 may transmit the ID (e.g., the host ID) allocated to the first device 210, the ID (e.g., the first slave ID) allocated to the second device 220, and the ID (e.g., the second slave ID) allocated to the third device 230, to the first device 210 to the third device 230. Before ID allocation or after the ID allocation, the path forming module 2193 may exchange information with the third device 230. After the ID allocation and the information exchange are completed, the path forming module 219-3 may maintain the CC terminals of the first interface 211, the second interface 213 and the third interface 215 in an operation mode.

For example, in response to a device connected to the docking device 200 being at least three or more, even after ID allocation and information exchange are completed, the path forming module 219-3 may maintain a CC terminal of an interface connected with the device in an operation mode. In this case, an electrical conductive path (e.g., a communication path) may be formed in the CC terminal of the second interface 213 and the CC terminal of the third interface 215. In this case, the second device 220 and the third device 230 may BMC communicate by using the electrical conductive path. That is, the second device 220 may transmit a data packet including an ID for data sending (e.g., the second slave ID allocated to the third device 230) at a period of time appointed to self. The third device 230 may receive the data packet. The third device 230 may transmit a data packet including an ID for data sending (e.g., the first slave ID allocated to the second device 230) at a period of time appointed to self. The second device 220 may receive the data packet.

The path forming module 219-3 may transmit the ID (e.g., the host ID) allocated to the first device 210, the ID (e.g., the first slave ID) allocated to the second device 220, the ID (e.g., the second slave ID) allocated to the third device 240, or the ID (e.g., the third slave ID) allocated to the fourth device 240, to the first device 210 to the fourth device 240. Before ID allocation or after the ID allocation, the path forming module 219-3 may exchange information with the fourth device 240. After the ID allocation and the information exchange are completed, the path forming module 219-3 may maintain the CC terminals of the first interface 211, the second interface 213, the third interface 215 and the fourth interface 217 in the operation mode. In this case, an electrical conductive path (e.g., a communication path) may be formed in the CC terminal of the second interface 213, the CC terminal of the third interface 215 and the CC terminal of the fourth interface 217. The second device 220 to the fourth device 240 may BMC communicate by using the electrical conductive path.

That is, the second device 220 may transmit a data packet including an ID for data sending (e.g., the ID allocated to the third device 230 or the ID allocated to the fourth device 240) at a period of time appointed to self. The third device 230 or the fourth device 240 may receive the data packet. The third device 230 may transmit a data packet including an ID for data sending (e.g., the ID allocated to the second device 230 or the ID allocated to the fourth device 240) at a period of time appointed to self. The second device 220 or the fourth device 240 may receive the data packet. The fourth device 240 may transmit a data packet including an ID for data sending (e.g., the ID allocated to the second device 230 or the ID allocated to the third device 230) at a period of time appointed to self. The second device 220 or the third device 230 may receive the data packet.

Figure 6:
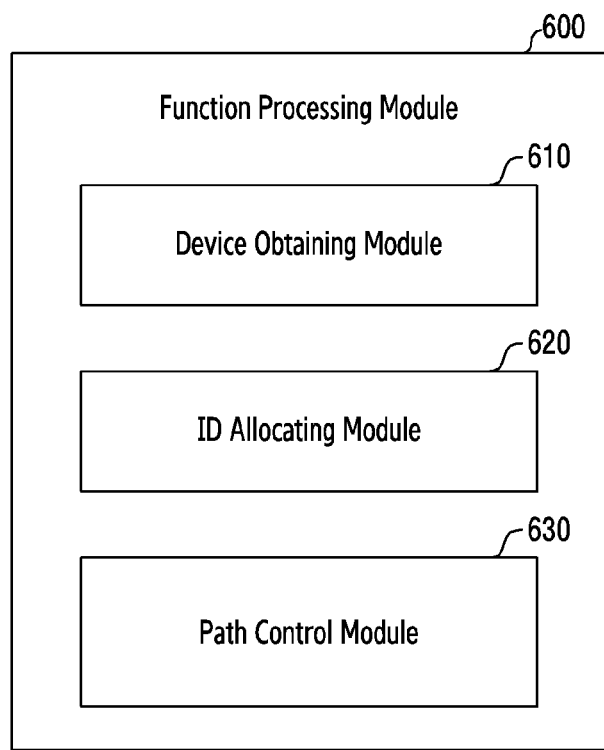
FIG. 6 is a diagram illustrating an example of a function processing module in an electronic device according to various embodiments.

FIG. 6 is a diagram illustrating an example of a function processing module in an electronic device according to various embodiments.

Referring to FIG. 6, the function processing module 600 may process an operation of obtaining a connection of a device (e.g., at least one of the first device 210 to the fourth device 240), allocating an ID to the connected device, transmitting the allocated ID to the connected device, and maintaining a CC terminal of an interface connected with the device in an awake state. The function processing module 600 may be included as a hardware module in a processor (e.g., the processor 120 of FIG. 1) including a processing circuitry, or be included as a software module. The function processing module 600 of FIG. 6 may be applied to a device to which a plurality of devices are connected in the daisy chain scheme of FIG. 2B. That is, the function processing module 600 may be included in a device such as the electronic device 101 of FIG. 1 or the first device 210.

This function processing module 600 may include a device obtaining module 610, an ID allocating module 620, and a path control module 630.

The device obtaining module 610 may obtain that an interface (or connector) of the second device 220 is inserted into an interface (e.g., the connection terminal 178). In response to the interface of the second device 220 being inserted, the device obtaining module 610 may obtain a signal (e.g., a device obtaining signal) from at least one of a VBUS pin, CC1 pin or CC2 pin of the connection terminal 178, and identify that the second device 220 is connected to the connection terminal 178 by the obtained signal. The connection terminal 178 may be formed as a USB type-C interface, and may be formed in plural.

In response to the second device 220 being connected with the third device 230 via a cable, the device obtaining module 610 may recognize (or obtain) that the third device 230 has been connected to the second device 220 via the second device 220. Both ends of an interface (or connector) of the cable connecting the second device 220 and the third device 230 may be all formed as USB type-C interfaces. The device obtaining module 610 may receive a signal (e.g., a device obtaining signal) of the third device 230 from the second device 220 via a CC terminal. To help the understanding of the disclosure, it has been described that the second device 220 forwards a signal of the third device 230 connected to self, but the signal of the third device 230 may be forwarded from the second device 220 to the first device 210 via the cable connected between the first device 210 and the second device 220.

In response to the fourth device 240 being connected to the third device 230 via the cable, the third device 230 may transmit a signal of the fourth device 240 to the second device 220, and the second device 220 may transmit the signal of the fourth device 240 to the device obtaining module 610. Herein, both ends of an interface (or connector) of the cable connecting the third device 230 and the fourth device 240 may be all formed as USB type-C interfaces. The device obtaining module 610 may recognize (or obtain) that the fourth device 240 has been connected to the third device 230 via the second device 220 and the third device 230.

The device obtaining module 610 according to various embodiments may obtain that a docking device (e.g., the docking device 200) is connected to the connection terminal 178. The device obtaining module 610 may obtain that at least one device among the second device 220 to the fourth device 240 is connected via the docking device 200.

The ID allocating module 620 may allocate an ID to the second device 220 connected to the connection terminal 178. The ID allocating module 219-2 may identify the number of connected devices, and allocate IDs, based on the number. Herein, the connected device may refer to not only the second device 220 connected to the connection terminal 178 but also a device connected to the second device 220 or the third device 230. For example, the ID allocating module 620 may allocate a host ID to self (e.g., the first device 210), and allocate a slave ID to the second device 220. In a state in which the second device 220 is connected to the connection terminal 178, in response to it being obtained that the third device 230 is connected through the device obtaining module 610, the ID allocating module 620 may reallocate IDs to the second device 220 including self and the third device 230. For example, the ID allocating module 620 may allocate a host ID to self, and allocate a first slave ID to the second device 220 connected to the connection terminal 178, and allocate a second slave ID to the third device 230 connected to the second device 220.

Or, in a state in which the second device 220 is connected to the connection terminal 178, in response to the fourth device 240 being connected to the second device 220 (e.g., without the third device 230), the ID allocating module 620 may reallocate IDs to the second device 220 including self and the fourth device 240. For example, the ID allocating module 620 may allocate a host ID to self, and allocate a first slave ID to the second device 220 connected to the connection terminal 178, and allocate a second slave ID to the fourth device 240 connected to the second device 220. In a state in which the second device 220 is connected to the connection terminal 178, in response to the third device 230 being connected to the second device 220 and the fourth device 240 being connected to the third device 230, the ID allocating module 620 may allocate a host ID to self, and allocate slave IDs (e.g., the first slave ID to the third slave ID) to the second device 220 to the fourth device 240. Or, the ID allocating module 620 may allocate an ID to the fourth device 240 in a state of maintaining the IDs allocated to the first device 210 to the third device 230.

The path control module 630 may transmit the allocated ID to the second device 220. That is, the path control module 630 may transmit the allocated slave ID to the second device 220 connected to the connection terminal 178. Before ID allocation or after the ID allocation, the path control module 630 may exchange information with the second device 220. The information is device information, and the path control module 630 may transmit its own device information (e.g., first device information of the first device 210), and send a request for information to the second device 220, and receive device information from the second device 220 by the request. The received device information may be stored in a memory (e.g., the memory 130) of the first device 210.

The path control module 630 according to various embodiments may transmit configuration information related to communication to at least one of the second device 220 to the fourth device 240. For example, the configuration information may include an instruction of maintaining a CC terminal of each of the second device 220 to the fourth device 240 in an operation mode (e.g., an awake state). In this case, the second device 220 to the fourth device 240 may perform communication between the second device 220 to the fourth device 240 without control of a control circuit (e.g., the processor 120) of the electronic device 101. At communication between the second device 220 to the fourth device 240, the control circuit may operate in a low power state (or sleep mode).

In response to ID allocation and information exchange being completed, the path control module 630 according to various embodiments may enable a CC terminal (e.g., CC1, CC2) of the connection terminal 178 to enter a sleep mode. That is, in response to allocating one host ID and one slave ID, the path control module 630 may enable the CC terminal of the connection terminal 178 to enter the sleep mode. Or, even in response to the ID allocation and the information exchange being completed, the path control module 630 may maintain the CC terminal of the connection terminal 178 in an operation mode (e.g., an awake state). Also, the path control module 630 may instruct the second device 220 to awake a CC terminal of the interface of the second device 220. Accordingly, an electrical conductive path (e.g., a communication path) may be formed in the CC terminal of the connection terminal 178 and the CC terminal of the interface of the second device 220. In this case, the first device 210 and the second device 220 may BMC communicate by using the electrical conductive path. That is, the second device 220 may transmit data to the first device 210 via the electrical conductive path.

The path control module 630 may transmit the ID (e.g., the host ID) allocated to the first device 210, the ID (e.g., the first slave ID) allocated to the second device 220, and the ID (e.g., the second slave ID) allocated to the third device 230, to the second device 220 and the third device 230. Before ID allocation or after the ID allocation, the path control module 630 may exchange information with the third device 230. After the ID allocation and the information exchange being completed, the path control module 630 may maintain the CC terminal of the connection terminal 178 in the operation mode. For example, in response to a device connected to the first device 210 being at least two or more, even after the ID allocation and the information exchange are completed, the path control module 630 may maintain the CC terminal of the connection terminal 178 in the operation mode. Also, the path control module 630 may instruct the second device 220 to awake the CC terminal of the interface of the second device 220. Also, the path control module 630 may instruct to awake the CC terminal of the interface of the third device 230 through the second device 220.

Accordingly, electrical conductive paths (e.g., communication paths) may be formed in the CC terminal of the connection terminal 178 and the CC terminal of the interface of the second device 220, and the CC terminal of the interface of the second device 220 and the CC terminal of the interface of the third device 230. In this case, the second device 220 and the third device 230 may BMC communicate by using the electrical conductive path. That is, the second device 220 may transmit data to the third device 230 through the electrical conductive path. Also, the third device 230 may transmit data to the second device 230 through the electrical conductive path. For example, the second device 220 may transmit a data packet including an ID for data sending (e.g., the ID allocated to the third device 230) at a period of time appointed to self. The third device 230 may receive the data packet. The third device 230 may transmit a data packet including an ID for data sending (e.g., the ID allocated to the second device 230) at a period of time appointed to self. The second device 220 may receive the data packet.

The path control module 630 may transmit the ID (e.g., the host ID) allocated to the first device 210, the ID (e.g., the first slave ID) allocated to the second device 220, the ID (e.g., the second slave ID) allocated to the third device 230, or the ID (e.g., the third slave ID) allocated to the fourth device 240, to the second device 220 to the fourth device 240. Before ID allocation or after the ID allocation, the path control module 630 may exchange information with the fourth device 240. After the ID allocation and the information exchange being completed, the path control module 630 may maintain a CC terminal of the connection terminal 178 in the operation mode. Also, the path control module 630 may instruct the second device 220 to awake the CC terminal of the interface of the second device 220. Also, the path control module 630 may instruct to awake the CC terminal of the interface of the third device 230 through the second device 220. Also, the path control module 630 may instruct to awake the CC terminal of the interface of the fourth device 240 through the second device 220 and the third device 230.

In this case, the second device 220 to the fourth device 240 may perform BMC communication, in that electrical conductive paths are formed through the CC terminals of the interfaces. That is, the second device 220 may transmit data to the third device 230 or the fourth device 240 via the electrical conductive path. Also, the third device 230 may transmit data to the second device 220 or the fourth device 240 via the electrical conductive path. Also, the fourth device 240 may transmit data to the second device 220 or the third device 230 via the electrical conductive path. For example, the second device 220 may transmit a data packet including an ID for data sending (e.g., the ID allocated to the third device 230 or the ID allocated to the fourth device 240) at a period of time appointed to self. The third device 230 or the fourth device 240 may receive the data packet. The third device 230 may transmit a data packet including an ID for data sending (e.g., the ID allocated to the second device 230 or the ID allocated to the fourth device 240) at a period of time appointed to self. The second device 220 or the fourth device 240 may receive the data packet. The fourth device 240 may transmit a data packet including an ID for data sending (e.g., the ID allocated to the second device 230 or the ID allocated to the third device 230) at a period of time appointed to self. The second device 220 or the third device 230 may receive the data packet. That is, the data packet may be forwarded from an originating device (e.g., the second device 220) to a receiving device (e.g., the third device 230) via a cable connected between the devices (the second device 220 and the third device 230, the third device 230 and the fourth device 240). Or, the data packet may go through at least one device (e.g., the third device 230) and be forwarded from an originating device (e.g., the second device 220) to a receiving device (e.g., the fourth device 240) via a cable.

An electronic device (e.g., the docking device 200) according to various embodiments may include at least one or more interfaces (e.g., the first interface 211 to the fourth interface 217) formed as universal serial bus (USB) type-C, and at least one control circuit (e.g., the control circuit 219) electrically connected to the interface. The control circuit may be configured to form a communication path, through chosen terminals of the interfaces, between at least two or more external devices connected to the interfaces.

The chosen terminal may be a configuration channel (CC) terminal of a USB type-C interface.

The CC terminal may be a CC1 pin or a CC2 pin.

The control circuit may be configured to awake chosen terminals of a first interface to a third interface, in response to a first external device (e.g., the first device 210) being connected to the first interface, a second external device (e.g., the second device 220) being connected to the second interface and a third external device (e.g., the third device 230) being connected to the third interface.

The control circuit 219 may be configured to allocate a host ID or a slave ID to each of the first external device to the third external device, and transmit the allocated host ID or slave ID to the first external device to third external device.

The control circuit 219 may be configured to, in response to the ID allocation being completed, maintain the chosen terminals of the first interface to the third interface in an awake state.

The control circuit 219 may be configured to perform bi-phase mark coding (BMC) communication through the chosen terminals between the external devices allocated the slave IDs.

The control circuit 219 may be configured to awake the chosen terminals such that the external devices transmit data at a given period of time by using the host ID or slave ID each allocated to the external devices.

An electronic device (e.g., the electronic device 101 or the first device 210) according to various embodiments may include a universal serial bus (USB) interface (e.g., the connection terminal 178), and a control circuit (e.g., the processor 120). The control circuit may be configured to identify a first external electronic device (e.g., the second device 220) and a second external electronic device (e.g., the third device 230) which are connected through the USB interface, and in relation to a communication between the first external electronic device and the second external electronic device, transmit setting information related to the communication to the first external electronic device or the second external electronic device such that the first external electronic device or the second external electronic device performs the communication by using a given pin corresponding to a configuration channel among a plurality of pins of the USB interface.

The USB interface may be plural.

In response to the USB interface being connected with a docking device, the electronic device may be connected with the first external electronic device and the second external electronic device via the docking device.

The first external electronic device and the second external electronic device may be configured to communicate without control of the control circuit.

The control circuit may be configured to operate in a low power state at communication between the first external electronic device and the second external electronic device.

The control circuit may be configured to allocate a host ID to the electronic device 101, and allocate a first slave ID to the first external device, and allocate a second slave ID to the second external device, and transmit the allocated host ID, first slave ID or second slave ID to the first external device and the second external device.

The control circuit may instruct the first external device to awake a chosen terminal of an interface of the first external device, and instruct to awake a chosen terminal of an interface of the second external device through the first external device.

The control circuit may be configured to perform bi-phase mark coding (BMC) communication via the chosen terminals between the first external device allocated the first slave ID and the second external device allocated the second slave ID.

Figure 7:
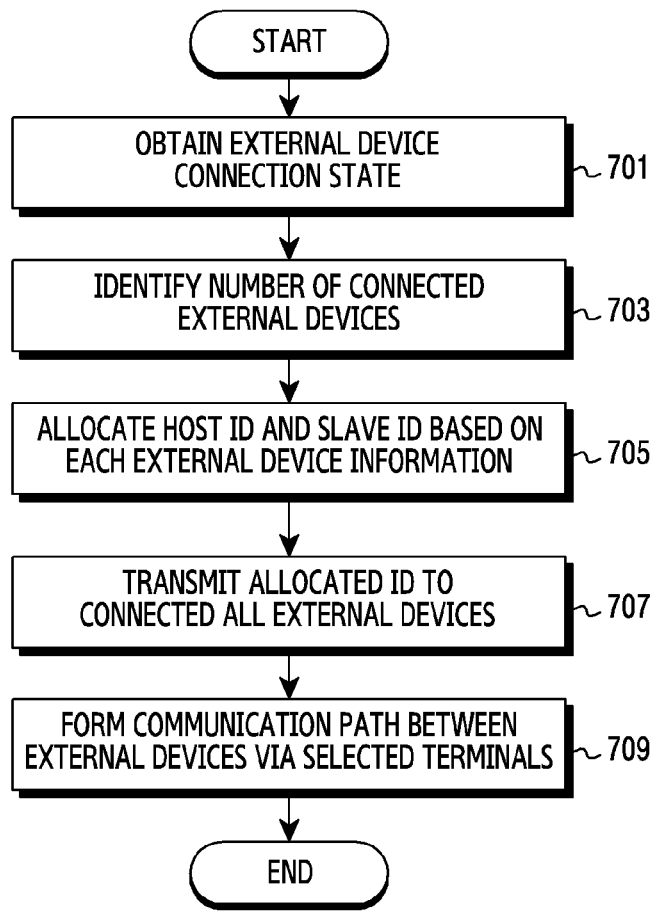
FIG. 7 is a flowchart illustrating a method for forming a communication path between slave devices according to various embodiments.

FIG. 7 is a flowchart illustrating a method for forming a communication path between slave devices according to various embodiments. Operation included in FIG. 7 may be performed in the docking device 200 or a host device (e.g., the first device 210). Below, the docking device 200 is described for example, but an embodiment is not limited to the docking device 220 by the description.

Referring to FIG. 7, in operation 701, the control circuit 219 (e.g., the device obtaining module 219-1) of the docking device 200 may obtain an external device connection state. The external device may refer to the first device 210, the second device 220, the third device 230 or the fourth device 240. In response to a fulfillment subject of FIG. 7 being the docking device 200, the external device may refer to the first device 210, the second device 220, the third device 230 or the fourth device 240. Or, in response to the fulfillment subject of FIG. 7 being the first device 210 that is a host device, the external device may refer to the second device 220, the third device 230 or the fourth device 240 except for the first device 210. The connection state may be a connection state with the external device, or a disconnection state. In response to an interface (or connector) of the external device being connected (or inserted) through the first interface 211 to the fourth interface 217, the control circuit 219 may obtain that the external device is connected. Or, in response to the interface (or connector) of the external device being separated from the first interface 211 to the fourth interface 217, the docking device 200 may obtain that the connection with the external device is released.

In operation 703, the control circuit 219 (e.g., the ID allocating module 219-2) of the docking device 200 may identify the number of the connected external devices. The control circuit 219 may identify how many a total of external devices currently connected to the docking device 200 are. In response to a connection of the external device being obtained, the control circuit 219 may receive external device information of the external device from the connected external device. The control circuit 129 may store the external device information in a memory of the docking device 200. The control circuit 219 may delete external device information of the disconnected external device from the memory.

In operation 705, the control circuit 219 (e.g., the ID allocating module 219-2) of the docking device 200 may allocate a host ID and a slave ID, based on each external device information. At ID allocation, the control circuit 219 may identify the number of devices currently connected to the docking device 200, and allocate IDs, based on the number. The control circuit 219 may periodically toggle pull-up (Rp) and pull-down (Rd) in each of the first interface 211 to the fourth interface 217, while allocating a host ID to a device (e.g., the first device 210) connected to pull-up (Rp), and allocating a slave ID to a device (e.g., at least one of the second external device 220 to the fourth external device 240) connected to pull-down (Rd).

For example, the control circuit 219 may allocate the host ID to the first device 210 connected to the first interface 211, and allocate the slave ID to the second device 220 connected to the second interface 213. In a state in which the first device 210 is connected to the first interface 211 and the second device 220 is connected to the second interface 213, in response to it being obtained that the third device 230 is connected to the third interface 215 through the device obtaining module 219-1, the control circuit 219 may reallocate IDs to the first device 210 to the third device 230. Or, the control circuit 219 may allocate an ID to the third device 230 in a state of maintaining the IDs allocated to the first device 210 and the second device 220. In a state in which the first device 210 is connected to the first interface 211 and the second device 220 is connected to the second interface 213, in response to it being obtained that the third device 230 is disconnected from the third interface 215 and the fourth device 240 is connected to the fourth interface 217, the control circuit 219 may reallocate IDs, based on the number of the connected devices.

In operation 707, the control circuit 219 (e.g., the path forming module 219-3) of the docking device 200 may transmit the allocated IDs to all the external devices connected. For example, the control circuit 219 may transmit an ID corresponding to each external device, to all the external devices connected to the docking device 200. For example, the control circuit 219 may transmit the ID (e.g., the host ID) allocated to the first device 210 and the ID (e.g., the slave ID) allocated to the second device 220, to the first device 210 and the second device 220. Or, the control circuit 219 may transmit the ID (e.g., the host ID) allocated to the first device 210, the ID (e.g., the first slave ID) allocated to the second device 220, and the ID (e.g., the second slave ID) allocated to the third device 230, to the first device 210 to the third device 230. Or, the control circuit 219 may transmit the ID (e.g., the host ID) allocated to the first device 210, the ID (e.g., the first slave ID) allocated to the second device 220, the ID (e.g., the second slave ID) allocated to the third device 230, or the ID (e.g., the third slave ID) allocated to the fourth device 240, to the first device 210 to the fourth device 240.

In operation 709, the control circuit 219 (e.g., the path forming module 219-3) of the docking device 200 may form a communication path between external devices through chosen terminals (e.g., CC terminals). For example, the control circuit 219 may maintain CC terminals of the first interface 211 and the second interface 213 in an operation mode (e.g., an awake state). Accordingly, an electrical conductive path (e.g., a communication path) may be formed in the CC terminal of the first interface 211 and the CC terminal of the second interface 213. In this case, the first device 210 and the second device 220 may BMC communicate by using the electrical conductive path. That is, the second device 220 may transmit data to the first device 210 via the electrical conductive path.

Or, the control circuit 219 may maintain the CC terminals of the first interface 211, the second interface 213 and the third interface 215 in the operation mode. An electrical conductive path (e.g., a communication path) may be formed in the CC terminal of the second interface 213 and the CC terminal of the third interface 215. In this case, the second device 220 and the third device 230 may BMC communicate by using the electrical conductive path. That is, the second device 220 or the third device 230 may transmit, via the communication path (e.g., the CC terminal), a data packet including an ID for data sending (e.g., the first slave ID allocated to the second device 220 or the second slave ID allocated to the third device 230) at a period of time appointed to self. The second device 220 or the third device 230 may receive the data packet via the communication path. The control circuit 219 may maintain the CC terminals of the first interface 211, the second interface 213, the third interface 215 and the fourth interface 217 in the operation mode. In this case, an electrical conductive path (e.g., a communication path) may be formed in the CC terminal of the second interface 213, the CC terminal of the third interface 215, and the CC terminal of the fourth interface 217. The second device 220 to the fourth device 240 may BMC communicate by using the electrical conductive path.

Figure 8:
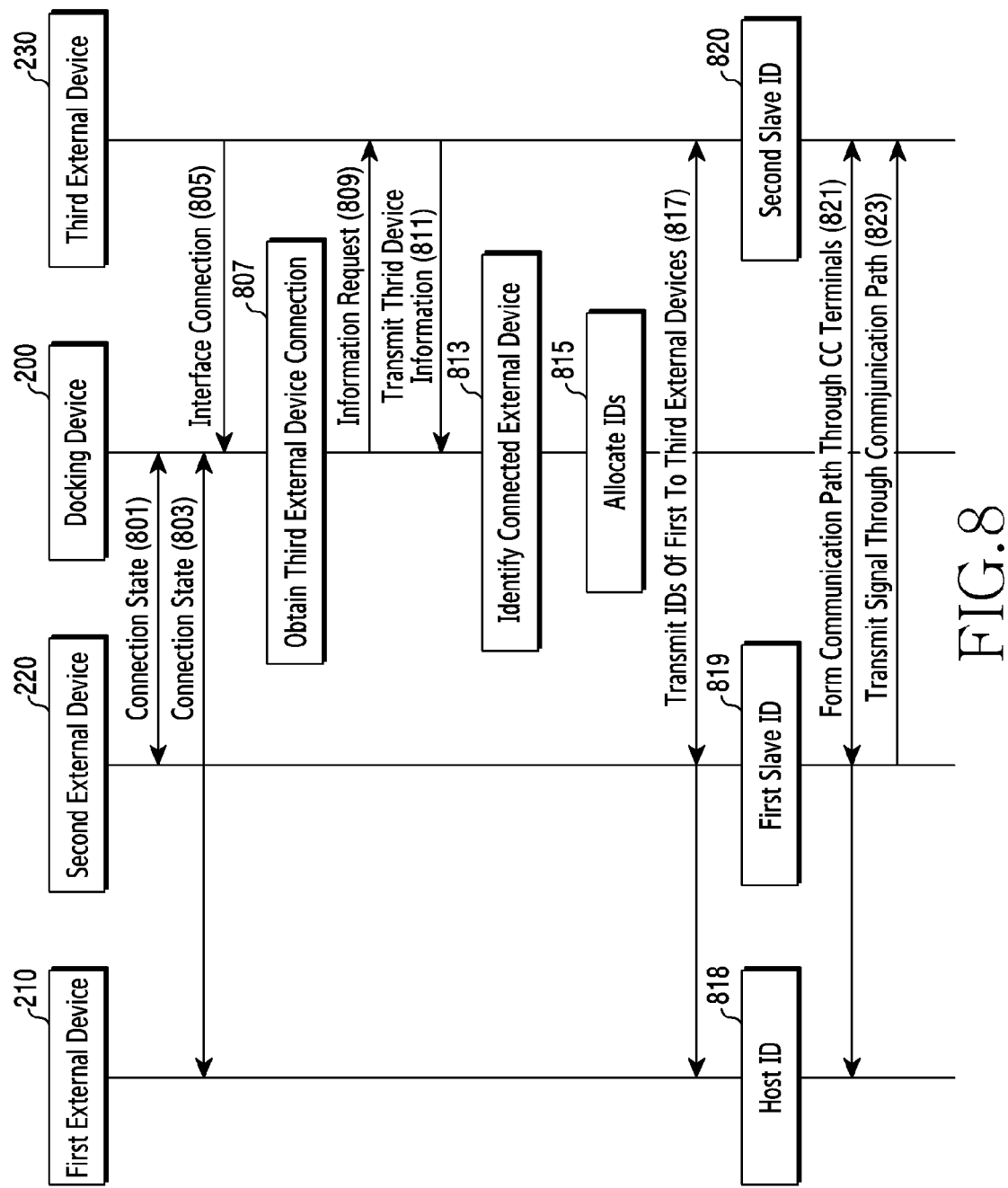
FIG. 8 is a ladder diagram illustrating a signal flow of a plurality of devices connected in a docking station scheme according to various embodiments.

FIG. 8 is a ladder diagram illustrating a signal flow of a plurality of devices connected in a docking station scheme according to various embodiments. In FIG. 8, a first external device 210 may be the first device 210, and a second external device 220 may be the second device 220, and a third external device 230 may be the third device 230.

Referring to FIG. 8, in operation 801, the docking device 200 may be in a connection state with the second external device 220. The connection state may refer to a state in which the second interface 213 of the docking device 200 is connected with an interface of the second external device 220. In response to obtaining that the second external device 220 is connected to the second interface 213, the docking device 200 may send a request for information to the second external device 220, and receive second device information from the second external device 220 by the request. The docking device 200 may allocate a slave ID to the second external device 220, and transmit the allocated slave ID to the second external device 220. The docking device 200 may store, in a memory, the second device information of the second external device 220 correspondingly to the allocated slave ID.

In operation 803, the docking device 200 may be in a connection state with the first external device 210. The docking device 200 may obtain that the first external device 210 is connected to the first interface 211, and receive first device information from the first external device 210, and allocate a host ID to the first external device 210, and transmit the allocated host ID to the first external device 210, and store, in the memory, the first device information of the first external device 210 correspondingly to the allocated host ID. Even the connection state in operation 803 is identical or similar with the connection state in operation 801 and therefore, its detailed description may be omitted.

In FIG. 8, it is illustrated that operation 801 is first performed, and operation 803 is later performed, but operation 803 may be first performed and operation 801 may be later performed, or may be simultaneously performed as well.

In operation 805, the third external device 230 may connect an interface of the third external device 230 to the docking device 200. For example, the interface of the third external device 230 may be connected (or inserted) to the third interface 215 of the docking device 200.

In operation 807, the docking device 200 may obtain a connection with the third external device 230. In response to the interface of the third external device 230 being connected to the third interface 215, the docking device 200 may identify that the third external device 230 is connected.

In operation 809, the docking device 200 may send a request for information to the third external device 230.

In operation 811, in response to the information request, the third external device 230 may transmit its own device information (e.g., third device information) to the docking device 200. The third device information may include at least one of a device identifier of the third external device 230, a device type, a protocol (e.g., a communication method), or power information (e.g., power consumption).

In operation 813, the docking device 200 may identify the connected external device. The docking device 200 may identify the number of the external device currently connected to the interface. For example, the docking device 200 may identify the number of the connected external devices, based on the device information stored in the memory. In the memory, currently connected device information may be stored, and disconnected device information may be deleted.

In operation 815, the docking device 200 may allocate an ID. In a state in which the first external device 210 and the second external device 220 are connected, in response to the third external device 230 being connected to the third interface 215, the docking device 200 may allocate an ID to the third external device 230 in a state of maintaining IDs allocated to the first external device 210 and the second external device 220. For example, in a state of maintaining allocating a host ID to the first external device 210 and allocating a slave ID (e.g., a first slave ID) to the second external device 220, the docking device 200 may allocate a second slave ID to the third external device 230. Or, the docking device 200 may reallocate IDs to the first external device 210 to the third external device 230.

In operation 817, the docking device 200 may transmit the allocated IDs to the first external device 210 to the third external device 230. The docking device 200 may transmit the ID allocated to each device, to all the devices connected to the interfaces. For example, the docking device 200 may transmit the ID (e.g., the host ID) allocated to the first external device 210, the ID (e.g., the first slave ID) allocated to the second external device 220 and the ID (e.g., the second slave ID) allocated to the third external device 230, to the first external device 210 to the third external device 230.

In operation 818, the first external device 210 may recognize that self is allocated a host ID, and the second external device 220 is allocated a first slave ID, and the third external device 230 is allocated a second slave ID.

In operation 819, the second external device 220 may recognize that self is allocated the first slave ID, and the first external device 210 is allocated the host ID, and the third external device 230 is allocated the second slave ID.

In operation 820, the third external device 230 may recognize that self is allocated the second slave ID, and the first external device 210 is allocated the host ID, and the second external device 220 is allocated the first slave ID.

In operation 821, the docking device 200 may form a communication path by using CC terminals of the first interface 211 to third interface 215 connected to the first external device 210 to third external device 230. For example, the docking device 200 may maintain the CC terminals of the first interface 211 and the third interface 215 in an awake state. BMC communication may be performed between the first external device 210 to the third external device 230 via the CC terminals.

In operation 823, the third external device 230 may transmit a signal to the second external device 220 via the formed communication path. For example, the third external device 230 may transmit a signal (or data packet) aiming at the first slave ID allocated to the second external device 220 at a period of time appointed to self. For example, the third external device 230 may transmit a signal related to screen brightness adjustment to the second external device 220 by using the first slave ID of the second external device 220. The second external device 220 may receive the signal, and adjust a screen brightness, based on the signal.

In response to the first external device 210 (or the electronic device 101) according to various embodiments being connected in the docking station scheme, the first external device 210 (or the electronic device 101) may, instead of the docking device 200, perform a role of the docking device 200. For example, the first external device 210 may obtain that other external devices (e.g., the second external device 220 to the fourth external device 240) are connected to the docking device 200, and allocate IDs to the obtained other external devices, and control a communication between the other external devices. That is, the other external devices may perform communication between the other external devices, without control of the first external device 210.

Figure 9:
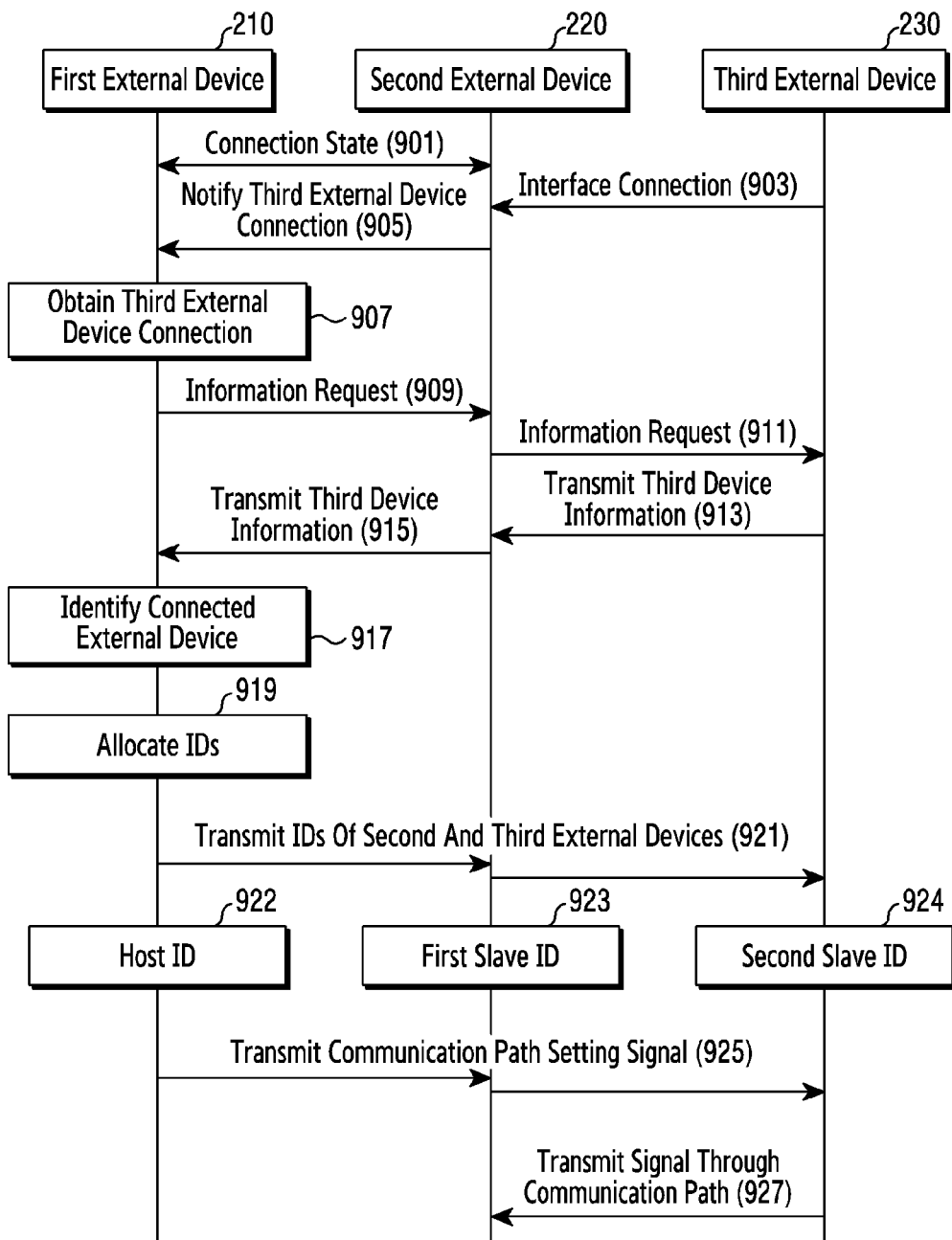
FIG. 9 is a ladder diagram illustrating a signal flow of a plurality of devices connected in a daisy chain scheme according to various embodiments.

FIG. 9 is a ladder diagram illustrating a signal flow of a plurality of devices connected in a daisy chain scheme according to various embodiments. In FIG. 9, an electronic device 210 may refer to the electronic device 101 of FIG. 1 or the first device 210, and a second external device 220 may be the second device 220, and a third external device 230 may be the third device 230.

Referring to FIG. 9, in operation 901, the electronic device 210 may be in a connection state with the second external device 220. The connection state may refer to a state in which the connection terminal 178 of the electronic device 210 is connected with the interface of the second external device 220. In response to obtaining that the second external device 220 is connected to the connection terminal 178, the electronic device 210 may send a request for information to the second external device 220, and receive second device information from the second external device 220 by the request. The electronic device 210 may allocate a host ID to self, and allocate a slave ID to the second external device 220, and transmit the allocated IDs (e.g., the host ID and the slave ID) to the second external device 220. The electronic device 210 may store, in the memory 130, second device information of the second external device 220 correspondingly to the allocated slave ID.

In operation 903, the third external device 230 may connect the interface of the third external device 230, to the second external device 220. For example, the interface of the third external device 230 may be connected (or inserted) to the interface of the second external device 220.

In operation 905, the second external device 220 may obtain a connection of the third external device 230. In response to the interface of the third external device 230 being connected, the second external device 220 may notify the electronic device 210 that the third external device 230 is connected.

In operation 907, the electronic device 210 may obtain the connection of the third external device 230. For example, the connection of the third external device 230 may be that a connection signal of the third external device 230 is forwarded from the second external device 220 to the electronic device 210 via a cable connected between the electronic device 210 and the second external device 220.

In operation 909, the electronic device 210 may request for information of the third external device 230. For example, the electronic device 210 may transmit a signal of requesting the information of the third external device 230 to the second external device 220.

In operation 911, the second external device 220 may send a request for information to the third external device 230. For example, the second external device 220 may receive a signal of requesting information of the third external device 230 from the electronic device 210, and transmit the received signal to the third external device 230.

In operation 913, the third external device 230 may transmit its own device information (e.g., third device information) to the second external device 220. The third external device 230 may receive a signal of requesting information of the third external device 230 from the second external device 220, and in response to the received signal, may transmit the third device information to the second external device 220.

In operation 915, the second external device 220 may transmit the third device information to the electronic device 210. The second external device 220 may receive the third device information from the third external device 230, and transmit the third device information to the electronic device 210.

In operation 917, the electronic device 210 may identify the connected external device. The electronic device 210 may receive the third device information from the second external device 220, and store the received third device information in the memory 130. The electronic device 210 may identify the number of external devices connected via either the connection terminal 178 or the second external device 220. For example, the electronic device 210 may identify the number of the connected external devices, based on the device information stored in the memory 130. The electronic device 210 may store currently connected device information in the memory 130, and delete disconnected device information from the memory 130.

In operation 919, the electronic device 210 may allocate an ID. In a state in which the second external device 220 is connected, in response to the third external device 230 being connected to the second external device 220, the electronic device 210 may allocate an ID to the third external device 230 in a state of maintaining an ID allocated to the second external device 220. For example, in a state of maintaining allocating a host ID to self and allocating a slave ID (e.g., a first slave ID) to the second external device 220, the electronic device 210 may allocate a second slave ID to the third external device 230. Or, the electronic device 210 may reallocate IDs to the second external device 220 to the third external device 230 inclusive of self.

In operation 921, the electronic device 210 may transmit the allocated IDs to the second external device 220 and the third external device 230. The electronic device 210 may transmit the ID (e.g., the host ID) allocated to self, the ID (e.g., the first slave ID) allocated to the second external device 220, or the ID (e.g., the second slave ID) allocated to the third external device 230, to the second external device 220 and the third external device 230.

In operation 922, the electronic device 210 may recognize that self is allocated the host ID, and the second external device 220 is allocated the first slave ID, and the third external device 230 is allocated the second slave ID.

In operation 923, the second external device 220 may recognize that self is allocated the first slave ID, and the electronic device 210 is allocated the host ID, and the third external device 230 is allocated the second slave ID.

In operation 924, the third external device 230 may recognize that self is allocated the second slave ID, and the electronic device 210 is allocated the host ID, and the second external device 220 is allocated the first slave ID.

In operation 925, the electronic device 210 may transmit a communication path setting signal to the second external device 220 and the third external device 230. The communication path setting signal may be a signal of instructing to awake CC terminals of the interfaces of the second external device 220 and the third external device 230. In this case, BMC communication may be performed between the second external device 220 and the third external device 230 via the CC terminals.

In operation 927, the third external device 230 may transmit a signal to the second external device 220 via the formed communication path. For example, the third external device 230 may transmit a signal (or data packet) aiming at the first slave ID allocated to the second external device 220 at a period of time appointed to self. For example, the third external device 230 may transmit a signal related to volume level adjustment to the second external device 220 by using the first slave ID of the second external device 220. The second external device 220 may receive the signal, and adjust a volume level, based on the signal.

Figure 10:
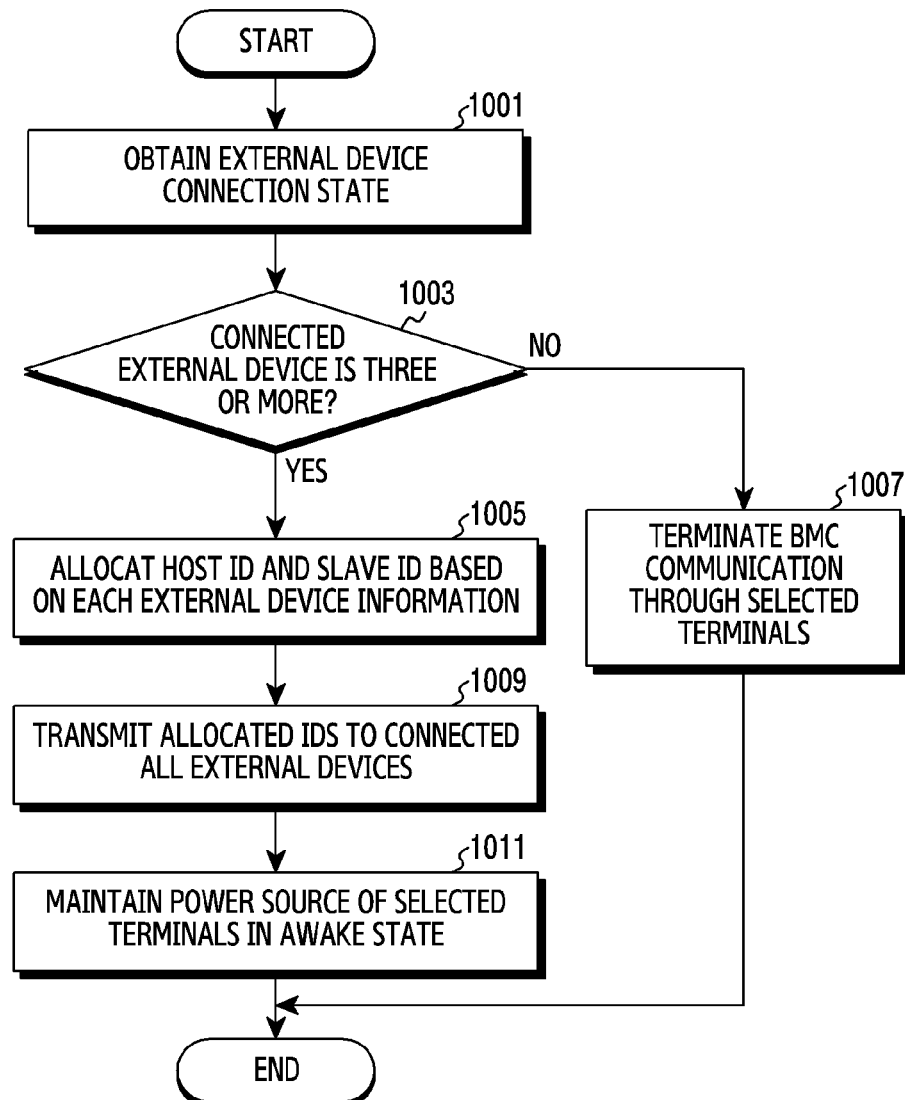
FIG. 10 is a flowchart illustrating an operation of forming a communication path between slave devices according to various embodiments.

FIG. 10 is a flowchart illustrating an operation of forming a communication path between slave devices according to various embodiments. The operation included in FIG. 10 may be performed in the docking device 200 or a host device (e.g., the first device 210). Below, the docking device 200 is described for example, but an embodiment is not limited to the docking device 220 by the description.

Referring to FIG. 10, in operation 1001, the control circuit 219 (e.g., the device obtaining module 219-1) of the docking device 200 may obtain an external device connection state. The connection state may be a connection state with an external device, or a disconnection state. In response to an interface (or connector) of the external device being connected (or inserted) through the first interface 211 to the fourth interface 217, the control circuit 210 may obtain that the external device is connected. Or, in response to the interface (or connector) of the external device being separated from the first interface 211 to the fourth interface 217, the docking device 200 may obtain that the connection with the external device is released. Operation 1001 may be identical or similar with operation 701 and therefore, its detailed description may be omitted.

In operation 1003, the control circuit 219 (e.g., the ID allocating module 219-2) of the docking device 200 may identify whether the number of the connected external devices is three or more. The control circuit 219 may identify how many a total of the external devices currently connected to the docking device 200 are, based on device information stored in the memory of the docking device 200.

In response to the number being three or more, the control circuit 210 may perform operation 1005, and in response to the number being less than three, may perform operation 1007.

In operation 1007, the control circuit 219 (e.g., the path forming module 219-3) of the docking device 200 may terminate BMC communication that uses chosen terminals. For example, in response to the external device currently connected to the docking device 200 being less than three in number, the control circuit 219 may exchange device information and in response to ID allocation being ended, convert the CC terminals into a sleep mode. For example, in response to the external device connected to the docking device 200 being two in number, one external device (e.g., the first external device 210) may have a host ID, and the other external device (e.g., any one of the second external device 220 to the fourth external device 240) may have a slave ID. In response to one host ID and one slave ID being allocated, the control circuit 219 may convert the CC terminals into the sleep mode, to terminate the BMC communication that uses the CC terminals.

In response to the number being three or more, in operation 1005, the control circuit 219 (e.g., the ID allocating module 219-2) of the docking device 200 may allocate a host ID and a slave ID, based on each external device information. At ID allocation, the control circuit 219 may identify the number of devices currently connected to the docking device 200, and allocate IDs, based on the number. The control circuit 219 may periodically toggle pull-up (Rp) and pull-down (Rd) in each of the first interface 211 to the fourth interface 217, while allocating a host ID to a device (e.g., the first device 210) connected to the pull-up (Rp), and allocating a slave ID to a device (e.g., at least two of the second external device 220 to the fourth external device 240) connected to the pull-down (Rd). Operation 1005 may be identical or similar with operation 705 and therefore, its detailed description may be omitted.

In operation 1009, the control circuit 219 (e.g., the path forming module 219-3) of the docking device 200 may transmit the allocated IDs to all the external devices connected. For example, the control circuit 219 may transmit an ID corresponding to each external device, to all the external devices connected to the docking device 200. For example, the control circuit 219 may transmit the ID (e.g., the host ID) allocated to the first device 210, the ID (e.g., the first slave ID) allocated to the second device 220, and the ID (e.g., the second slave ID) allocated to the third device 230, to the first device 210 to the third device 230. Or, the control circuit 219 may transmit the ID (e.g., the host ID) allocated to the first device 210, the ID (e.g., the first slave ID) allocated to the second device 220, the ID (e.g., the second slave ID) allocated to the third device 230, or the ID (e.g., the third slave ID) allocated to the fourth device 240, to the first device 210 to the fourth device 240.

In operation 1011, the control circuit 219 (e.g., the path forming module 219-3) of the docking device 200 may maintain a power source of the chosen terminals (e.g., CC terminals) in an awake state. For example, the control circuit 219 may maintain the CC terminals of the first interface 211 to the third interface 215 in an operation mode (e.g., an awake state). An electrical conductive path (e.g., a communication path) may be formed in the CC terminal of the second interface 213 and the CC terminal of the third interface 215. In this case, the second device 220 and the third device 230 may BMC communicate by using the electrical conductive path. That is, the second device 220 or the third device 230 may transmit, via the communication path (e.g., the CC terminal), a data packet including an ID for data sending (e.g., the first slave ID allocated to the second device 220 or the second slave ID allocated to the third device 230) at a period of time appointed to self.

The electronic device according to various embodiments disclosed in the present document may be devices of various types. The electronic device may include, for example, at least one of a portable communication device (e.g., a smart phone), a computer device, a portable multimedia device, a portable medical device, a camera, a wearable device, or a home appliance. The electronic device according to an embodiment of the present document is not limited to the aforementioned devices.

The expression of the singular form may include the expression of the plural form unless otherwise dictating clearly in context. In the present document, the expressions "A or B", "at least one of A and/or B", "A, B or C", "at least one of A, B and/or C" or the like may include all available combinations of words enumerated together. The expressions "a first", "a second", "the first", "the second", etc. may use corresponding components irrespective of order and/or importance, and are used to distinguish a component from another without limiting the corresponding component. When it is mentioned that any (e.g., first) component is "(operatively or communicatively) coupled with/to" or "connected to" another (e.g., second) component, the any component may be directly coupled to the another component, or be coupled to the another component through a further component (e.g., a third component).

A method for operating in an electronic device having at least one or more interfaces formed as universal serial bus (USB) type-C according to various embodiments may include obtaining that an external device is connected to the interface, and forming a communication path between at least two or more external devices connected to the interfaces through chosen terminals of the interfaces, based on the obtaining.

In response to a first external device being connected to a first interface of the electronic device, and a second external device being connected to a second interface of the electronic device, and a third external device being connected to a third interface of the electronic device, the forming may include activating the chosen terminals of the first interface to the third interface.

The method may further include allocating a host ID or a slave ID to each of the first external device to the third external device, and transmitting the allocated host ID or slave ID to the first external device to the third external device.

The method may include maintaining the selected terminals of the first interface to third interface in an awake state in response to the ID allocation being completed.

The forming may further include controlling bi-phase mark coding (BMC) communication through the selected terminals between the external devices allocated the slave IDs.

The forming may further include awakening the selected terminals such that the external devices transmit data at a given period of time by using the host ID or slave ID each allocated to the external devices.

A computer program product according to various embodiments may include obtaining that an external device is connected to the interface, and forming a communication path between at least two or more external devices connected to the interfaces through chosen terminals of the interfaces, based on the obtaining.

The term "module" used in the present document includes a unit consisting of hardware, software or firmware, and may be, for example, used interchangeably with the terms "logic", "logic block", "component", "circuit", etc. The "module" may be an integrally configured component or the minimum unit performing one or more functions or a part thereof. For example, the module may consist of an application-specific integrated circuit (ASIC).

Various embodiments of the present document may be implemented by software (e.g., a program 140) that includes an instruction stored in a machine (e.g., computer)-readable storage media (e.g., the internal memory 136 or external memory 138). The machine, which is a device loading a stored instruction from a storage media and operable according to the loaded instruction, may include an electronic device (e.g., the electronic device 101) according to disclosed embodiments. In response to the instruction being executed by a processor (e.g., the processor 120), the processor may perform a function corresponding to the instruction by itself or by using other components under the control of the processor. The instruction may include a code provided or executed by a compiler or interpreter. The machine-readable storage medium may be provided in the form of a non-transitory storage medium. Here, 'non-transitory' nothing but signifies that the storage medium does not include a signal and is tangible and does not distinguish that data is stored in the storage medium semi-permanently or temporarily.

According to an embodiment, a method according to various embodiments disclosed in the present document may be included and provided in a computer program product. The computer program product may be traded as a product between a seller and a buyer. The computer program product may be distributed on-line in the form of a machine-readable storage medium (e.g., compact disc read only memory (CD-ROM)), or through an application store (e.g., PlayStore™). In response to being distributed online, at least part of the computer program product may be at least temporarily stored or be temporarily provided in the machine-readable storage medium, such as a memory of the manufacturer's server, a server of the application store, or a relay server.

Components (e.g., modules or programs) according to various embodiments may each consist of a single or plurality of entities, and some sub components among the aforementioned corresponding sub components may be omitted, or other sub components may be further included in various embodiments. Alternatively or additionally, some components (e.g., modules or programs) may be integrated into one entity, to identically or similarly perform a function carried out by each of the corresponding components disintegrated. Operations carried out by a module, a program or a different component according to various embodiments may be executed in a sequential, parallel, repeated or heuristic manner, or at least some operations may be executed in different order or be omitted, or another operation may be added.

What is claimed is:

1. An electronic device comprising:
    at least two universal serial bus (USB) interfaces; and
    a control circuit,
    wherein the control circuit is configured to:
        identify a first external electronic device which is connected to a first USB interface and a second external electronic device which is connected to a second USB interface,
        in response to identifying the first external electronic device being connected to the first USB interface and the second external electronic device being connected to the second USB interface, control configuration channel (CC) terminals of the first USB interface and the second USB interface to enter into an operation mode, and
        transmit configuration information associated with the operation mode of the CC terminals, to at least one of the first external electronic device and the second external electronic device,
    wherein while the operation mode of CC terminals is maintained:
        the control circuit is configured to operate in a low power state, and
        the first external electronic device and the second external electronic device perform communication between the first external electronic device and the second external electronic device.

2. The electronic device of claim 1, wherein the USB interface is plural.

3. The electronic device of claim 1, wherein in response to the USB interface being connected with a docking device, the electronic device is connected with the first external electronic device and the second external electronic device via the docking device.

4. The electronic device of claim 1, wherein the control circuit is configured to perform bi-phase mark coding (BMC) communication through the CC terminals between the first external electronic device and the second external electronic device.

5. The electronic device of claim 1, wherein the control circuit is configured to:
    allocate a host ID to the electronic device,
    allocate a first slave ID to the first external electronic device,
    allocate a second slave ID to the second external electronic device, and
    transmit the allocated host ID, the first slave ID, or the second slave ID to the first external electronic device and the second external electronic device.

6. The electronic device of claim 5, wherein the control circuit is configured to:
    instruct the first external electronic device to awake a chosen terminal of an interface of the first external electronic device, and
    instruct the second external electronic device to awake a chosen terminal of an interface of the second external electronic device through the first external electronic device.

7. The electronic device of claim 1, wherein the CC terminals are configured to be a CC1 pin and a CC2 pin.

8. A method for operating in an electronic device, the method comprising:
    identifying, by a control circuit of the electronic device, a first external electronic device which is connected to a first USB interface and a second external electronic device which is connected a second USB interface;
    in response to identifying the first external electronic device being connected to the first USB interface and the second external electronic device being connected to the second USB interface, controlling, by the control circuit, configuration channel (CC) terminals of the first USB interface and the second USB interface to enter into an operation mode;
    transmitting, by the control circuit, configuration information associated with the operation mode of the CC terminals to at least one of the first external electronic device and the second external electronic device; and
    operating, by the control circuit, in a low power state while the operation mode of CC terminals is maintained,
    wherein the first external electronic device and the second external electronic device perform communication between the first external electronic device and the second external electronic device while the operation mode of CC terminals is maintained.

9. The method of claim 8, further comprising:
    allocating a host ID or a slave ID to the first external electronic device and the second external electronic device; and
    transmitting the allocated the host ID or slave ID to the first external electronic device and the second external electronic device.

10. The electronic device of claim 1, wherein the CC terminals include a first CC terminal disposed in the first USB interface and a second CC terminal disposed in the second USB interface.

11. An electronic device comprising:
at least two universal serial bus (USB) interface;
a control circuit; and
a memory configured to store instructions that, when executed by the control circuit, cause that the control circuit to control to:
- identify a first external electronic device which is connected to a first USB interface and a second external electronic device which is connected to a second USB interface,
- in response to identifying the first external electronic device being connected to the first USB interface and the second external electronic device being connected to the second USB interface, control configuration channel (CC) terminals of the first USB interface and the second USB interface to enter into an operation mode,
- transmit configuration information associated with the operation mode of the CC terminals, to at least one of the first external electronic device and the second external electronic device, and operate in a low power state while the operation mode of CC terminals is maintained, wherein the first external electronic device and the second external electronic device perform communication between the first external electronic device and the second external electronic device while the operation mode of CC terminals is maintained.

* * * * *